(12) United States Patent
Shigehiro et al.

(10) Patent No.: US 9,129,566 B2
(45) Date of Patent: Sep. 8, 2015

(54) IMAGE DISPLAYING MEDIUM, IMAGE DISPLAY DEVICE, WRITING DEVICE AND DISPLAYING METHOD

(75) Inventors: Kiyoshi Shigehiro, Kanagawa (JP);
Yasufumi Suwabe, Kanagawa (JP);
Yoshinori Machida, Kanagawa (JP);
Yoshiro Yamaguchi, Kanagawa (JP);
Takeshi Matsunaga, Kanagawa (JP);
Atsushi Hirano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1076 days.

(21) Appl. No.: 11/889,735

(22) Filed: Aug. 16, 2007

(65) Prior Publication Data
US 2008/0036731 A1  Feb. 14, 2008

Related U.S. Application Data

(63) Continuation-in-part of application No. 11/511,225, filed on Aug. 29, 2006, now abandoned.

(30) Foreign Application Priority Data

Feb. 14, 2006 (JP) ................................. 2006-036877
Feb. 9, 2007 (JP) ................................. 2007-31006

(51) Int. Cl.
*G09G 3/34* (2006.01)
*G02F 1/167* (2006.01)
*G09G 3/20* (2006.01)

(52) U.S. Cl.
CPC ............... *G09G 3/344* (2013.01); *G02F 1/167* (2013.01); *G09G 3/2003* (2013.01); *G02F 2001/1678* (2013.01); *G02F 2203/34* (2013.01)

(58) Field of Classification Search
USPC ......................................... 359/296
See application file for complete search history.

(56) References Cited

U.S. PATENT DOCUMENTS 3,689,400 A * 9/1972 Ota ............................... 399/131
5,006,422 A   4/1991 Sakurai et al.
6,017,584 A   1/2000 Albert et al.

(Continued)

FOREIGN PATENT DOCUMENTS

JP   A 64-39630   2/1989
JP   A 1-267525   10/1989

(Continued)

OTHER PUBLICATIONS

Kinzoku Nanoryushino Gosei, Chosei, Control Gijutsuto Oyotenkai (Synthesis, Preparation, and Control Technique of Metal Nanoparticles and Development of Applications), Technical Information Institute Co., Ltd. (2004).

(Continued)

*Primary Examiner* — Amr Awad
*Assistant Examiner* — Andre Matthews
(74) *Attorney, Agent, or Firm* — Oliff PLC

(57) ABSTRACT

The present invention provides an image display medium comprising a pair of substrates at least one of which having translucency, the substrates being disposed opposite to each other with a gap, a dispersion medium which has translucency and is enclosed in a space between the pair of substrates; and plural kinds of particle groups which are movably dispersed in the dispersion medium, move according to an electric field formed, and have different colors and forces for separation from the substrates.

18 Claims, 8 Drawing Sheets

(56) References Cited

U.S. PATENT DOCUMENTS

| | | | |
|---|---|---|---|
| 6,323,989 B1 * | 11/2001 | Jacobson et al. | 359/296 |
| 6,400,492 B1 * | 6/2002 | Morita et al. | 359/296 |
| 6,636,186 B1 * | 10/2003 | Yamaguchi et al. | 345/31 |
| 7,034,987 B2 * | 4/2006 | Schlangen | 359/296 |
| 2005/0105161 A1 * | 5/2005 | Nakai et al. | 359/296 |
| 2005/0286116 A1 * | 12/2005 | Kanbe | 359/296 |
| 2006/0203327 A1 | 9/2006 | Yasuda | |

FOREIGN PATENT DOCUMENTS

| | | |
|---|---|---|
| JP | A 2000-194021 | 7/2000 |
| JP | A 2000-322007 | 11/2000 |
| JP | A 2001-290178 | 10/2001 |
| JP | A 2002-202532 | 7/2002 |
| JP | A 2003-149690 | 5/2003 |
| JP | A 2003-241229 | 8/2003 |
| JP | A 2004-85635 | 3/2004 |
| JP | A 2004-522180 | 7/2004 |
| JP | A 2004-294955 | 10/2004 |
| JP | A 2005-49657 | 2/2005 |
| JP | A 2005-128143 | 5/2005 |
| JP | A 2006-17963 | 1/2006 |
| JP | A 2007-140129 | 6/2007 |
| WO | WO 02/057843 A2 | 7/2002 |

OTHER PUBLICATIONS

Jul. 10, 2012 Notice of Reasons for Rejection issued in Japanese Patent Application No. 2007-031006 (with translation).

* cited by examiner

| DISPLAY COLOR | ORDER | PARTICLE COLOR | POLARITY |
|---|---|---|---|
| BLACK | 1 | Y, M, C | POSITIVE ELECTRODE |
| BLUE | 1 | M, C | POSITIVE ELECTRODE |
| CYAN | 1 | C | POSITIVE ELECTRODE |
| MAGENTA | 1 | M, C | POSITIVE ELECTRODE |
| | 2 | Y, C | NEGATIVE ELECTRODE |
| YELLOW | 1 | Y, M, C | POSITIVE ELECTRODE |
| | 2 | M, C | NEGATIVE ELECTRODE |
| RED | 1 | Y, M, C | POSITIVE ELECTRODE |
| | 2 | C | NEGATIVE ELECTRODE |
| GREEN | 1 | Y, M, C | POSITIVE ELECTRODE |
| | 2 | M, C | NEGATIVE ELECTRODE |
| | 3 | C | POSITIVE ELECTRODE |

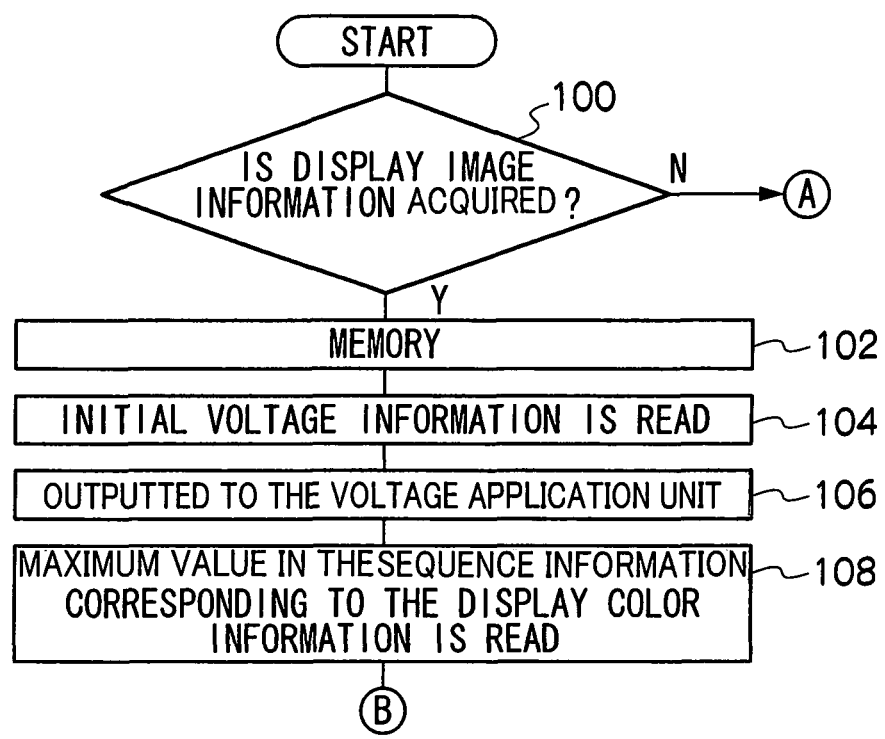

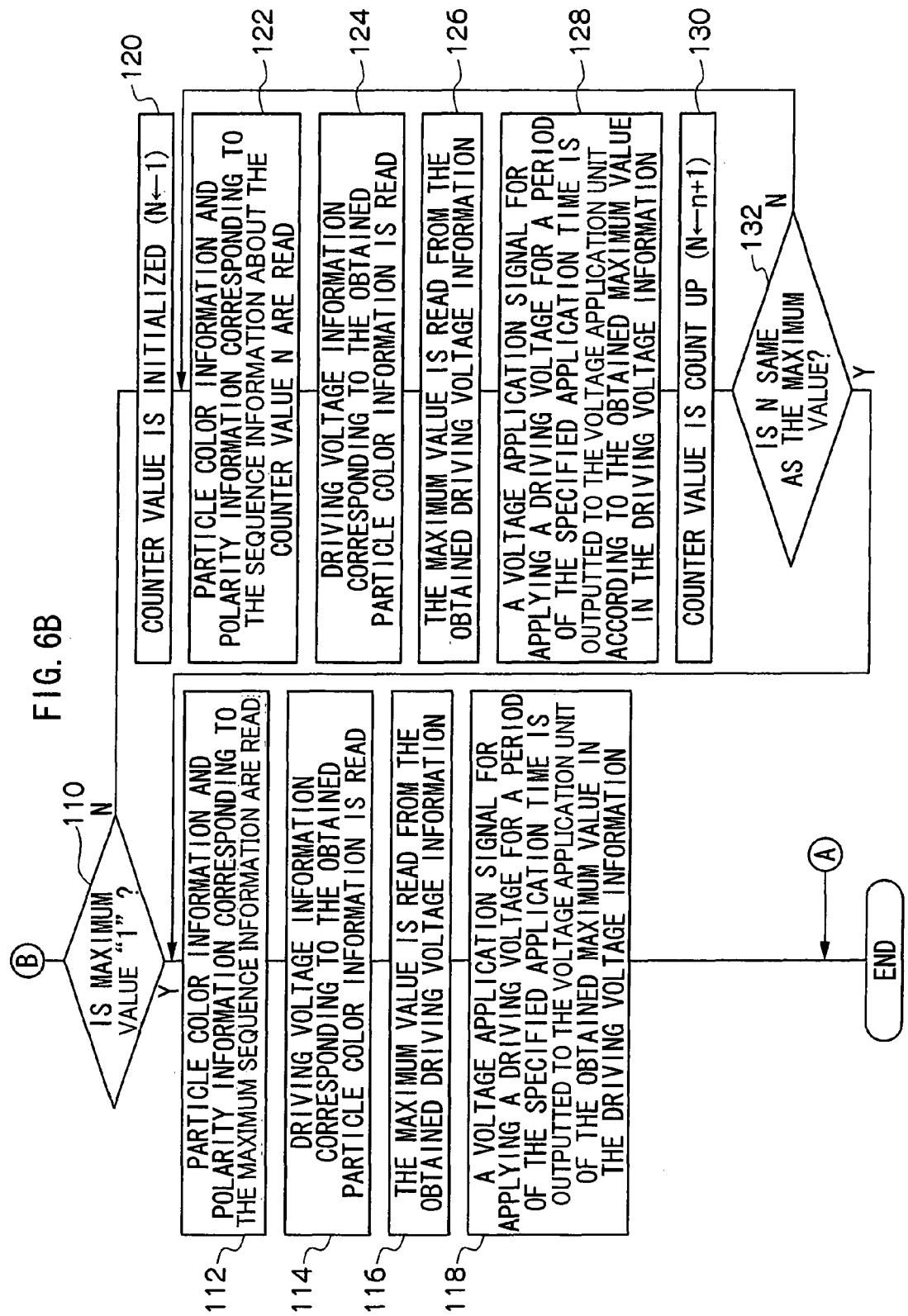

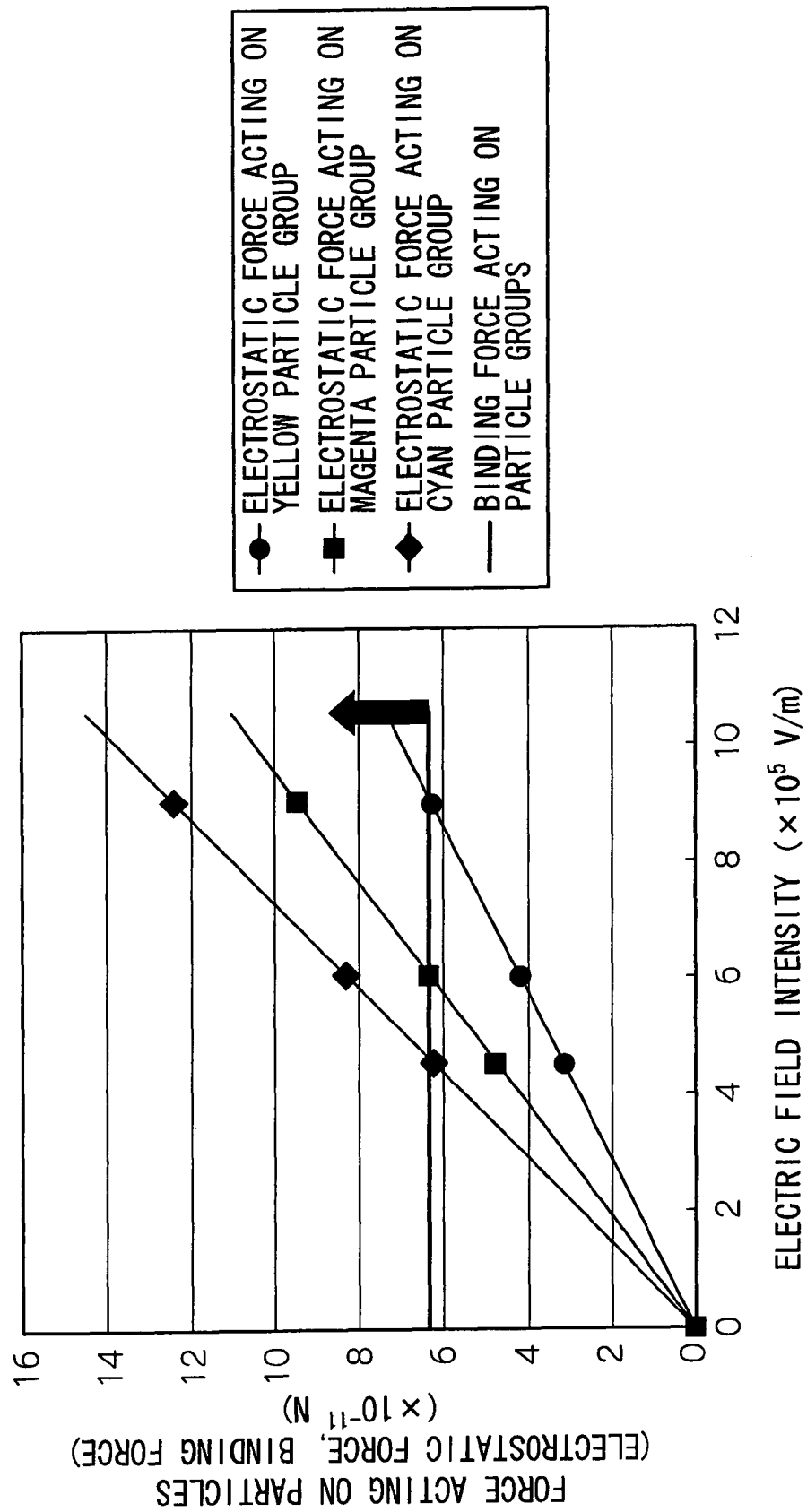

IMAGE DISPLAYING MEDIUM, IMAGE DISPLAY DEVICE, WRITING DEVICE AND DISPLAYING METHOD

CROSS-REFERENCE TO RELATED APPLICATION

This application claims priority under 35 USC 119 from Japanese Patent Application Nos. 2006-036877 and 2007-031006 filed Feb. 14, 2006 and Feb. 9, 2007, respectively. This application is a continuation-in-part of U.S. application Ser. No. 11/511,225, the disclosure of which is incorporated by reference herein.

BACKGROUND

1. Technical Field

The present invention relates to an image display medium, an image display device, a writing device and a displaying method, and in particular relates to an image display medium, an image display device a writing device, and a displaying method that display an image by the movement particles.

2. Related Art

Conventionally, display technologies such as Twisting Ball Display (rotational display by particles colored separately into two colors), or using electrophoresis, magnetophoresis, thermal rewritable medium, liquid crystal having memory function and the like have been proposed for a sheet-like image display medium which is repeatedly rewritable.

Among the above described display technologies, although thermally rewritable medium and liquid crystal having memory function are excellent in memory function for image, a color of its display surface cannot be made as white as white paper. Thus, it is difficult to confirm a distinction between image parts and non-image parts by means of visual observation in the case when a certain image is displayed, that is, there has been a problem of poor image quality. Other display technologies using electrophoresis or magnetophoresis are provided with memory function for image, and colored particles are dispersed in a white liquid. Thus, the display technologies using electrophoresis or magnetophoresis are excellent in white displaying. However, there has been a problem of poor image quality, since the white liquid enters between colored particles, black color forming image parts results in grayish.

Moreover, since white liquid is enclosed inside an image display medium, there is a possibility that the white liquid would leak outside the image display medium, if the image display medium is removed from an image display unit and handled roughly like paper. As another technology, a Twisting Ball Display has a memory function. Since inside an image display medium oil exists only in cavities around particles, but in a substantially solid state, it is comparatively easy to make the image display medium in the form of a sheet. However, even if each hemispherical surface of the particles has been coated in white and perfectly aligned at a display side, light entering between spheres of the particles is not reflected and is lost inside the display. Thus, in principle, a white display having a coverage of 100% cannot be achieved, and the color of the display results in slightly grayish appearance. Further, since a particle size is required to be smaller than a pixel size in order to obtain a high resolution, particles having different colors coated on must be made smaller, requiring a manufacturing technique of a high degree of precision.

A display technology, in which a conductive colored toner and white particles are contained in space between opposing electrode substrates, and electric charges are injected through a charge transport layer disposed on the inside surface of the electrode of a non-display substrate to the conductive colored toner, and an electric field between the electrode substrates causes charge-injected conductive colored toner to move toward a display substrate located facing the non-display substrate, and the conductive colored toner sticks to the inside of the display substrate, and contrast between the conductive colored toner and the white particles enables display of an image, was proposed as a display technology using a toner that solves such problems as mentioned above. The display technology is excellent in that the whole image display medium is made of solid matters and that display of white and black (color) can be completely switched in principle.

However, the above-described display technologies are in principle for achieving good two-color contrast, thus multicolor display of two or more colors requires separately driving pixels which are divided into segments such as CMY and RGB. Such dividing of pixels could reduce the display resolution to one third, even when the same number of pixels is used.

SUMMARY

The present invention has been made in view of the above circumstances and provides an image display medium, an image display device, and a displaying method.

According to an aspect of the invention, there is provided an image display medium comprising: a pair of substrates at least one of which having translucency, the substrates being disposed opposite to each other with a gap therebetween; a dispersion medium which has translucency and is enclosed between the pair of substrates; and plural kinds of particle groups which are movably dispersed in the dispersion medium, move according to an electric field, and different kinds have different colors and different forces for separation from the substrates.

BRIEF DESCRIPTION OF THE DRAWINGS

Embodiments of the present invention will be described in detail based on the following figures, wherein:

FIG. 5 is a table showing an example of information stored in the correspondence table 14B according to the present exemplary embodiment;

FIG. 6A is a flowchart showing the processing executed in the control unit according to the present exemplary embodiment;

FIG. 6B is a flowchart showing the processing executed in the control unit according to the present exemplary embodiment; and FIG. 7 is a diagram showing the relationship between the force acting on the particles and the electric field intensity, which has been prepared based on the result shown in Table 2 according to the present exemplary embodiment.

DETAILED DESCRIPTION

Figure 1:
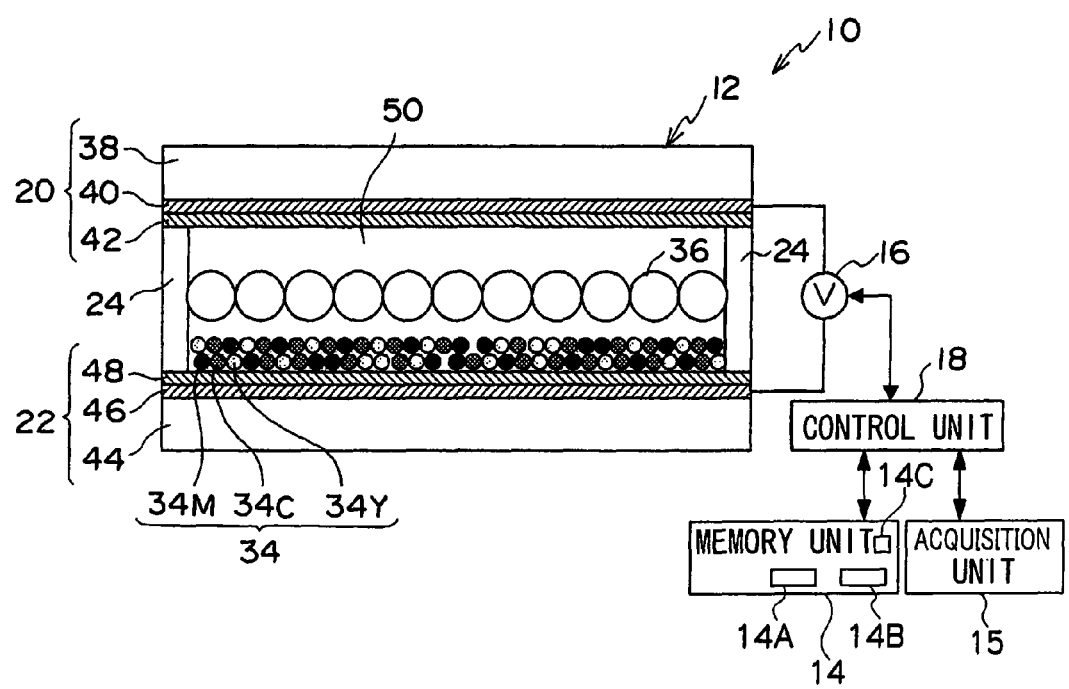
FIG. 1 is a schematic block diagram of the image display device according to the present exemplary embodiment.

The image display medium of the invention comprises a pair of substrates at least one of which having translucency, the substrates being disposed opposite to each other with a gap, a dispersion medium which has translucency and is enclosed between the pair of substrates and plural kinds of particle groups which are movably dispersed in the dispersion medium, move according to an electric field formed between the substrates, and have different colors and different forces for separation from the substrates.

At least one of the pair of substrates of the image display medium of the invention has translucency, and the substrates are disposed opposite to each other with a gap. A dispersion medium having at least translucency is enclosed in the space between the pair of substrates, and plural kinds of particle groups are dispersed in the dispersion medium.

The plural kinds of particle groups are different each other at least in color, and in the force for separation from the pair of substrates.

Wherein the force of the particle groups to initiate moving from the substrate shows the difficulty in the detachment of the particles of the particle groups from the substrate. The force for separation of the particle groups to initiate moving from the substrate is the difference between the electrostatic force which operates on the particle groups to move the particles from one substrate to the opposing other substrate, and the binding force which opposes the electrostatic force to keep the particle groups at the substrate. More specifically, when the electrostatic force is higher than the binding force, the force for separation to initiate moving from the substrate is positive, and the particles separate from the substrate to move to the opposing other substrate. On the other hand, when the electrostatic force is smaller than the binding force, the force for separation to initiate moving from the substrate is negative, and the particles remain on the original substrate. The difference in the force of the particle groups to separate the substrate indicates that, in consideration of the fact that the particle groups move according to the electric field formed between the pair of substrates, the particle groups initiate moving at different electric field intensities in the dispersion medium.

Therefore, the particles of the particle groups separate from one substrate of the pair of substrates and initiate moving to the other substrate at different electric field intensities.

Thus, the plural particle groups dispersed in the dispersion medium between the pair of substrates of the image display medium of the invention initiate moving at different electric field intensities depending on the kind of the particles.

In order to initiate moving in a dispersion medium at different electric field intensities, the color particles must have different forces for separation from the substrates (force for separation=electrostatic force−binding force). This is achieved by generally equalizing the binding force and varying the electrostatic force among the color particle groups. Alternatively, this is also achieved by generally equalizing the electrostatic force and varying the binding force among the color particle groups. The power to bind the particle groups to the substrate (binding force) includes magnetic forces acting on the particle groups, flow resistance of particles due to the weak network among the particles, and van der Waals forces between particles or between a particle and a substrate. In order to vary the electrostatic force among the color particle groups, the particle groups must have different average charges of one particle from each other. In order to generally equalize the binding force and vary the electrostatic force among the color particle groups, the magnetic force acting on the particle groups, the flow resistance of the particles, and the van der Waals forces between the particles or a particle and a substrate must be generally equal, and the particle groups must have different average charges of one particle. Further, in order to generally equalizing the electrostatic force and vary the binding force among the color particle groups, the average charge of one particle must be generally equalized among the color particle groups, and the plural particle groups must be different from each other in, for example, the resistance at the interface with the dispersion medium, the quantity of magnetism of one particle, the volume average primary particle diameter of one particle, or the shape factor SF1 of one particle.

By adjusting at least one or plural of these factors, the color particle groups to be enclosed between the pair of substrates of the image display medium of the invention can be adjusted such that they initiate moving at different electric field intensities, and can have different forces for separation from the pair of substrates.

As described above, plural kinds of particle groups having different colors and forces for separation from the pair of substrates are dispersed in the dispersion medium of image display medium of the invention, thus the formation of electric fields having different intensities between the pair of substrates allows to selectively move the particle group of desired color, which reduces color mixing, and achieves sharp color display with reducing the deterioration of the image quality.

The above-described particle groups may be composed of a cyan particle group of cyan color (C), a magenta particle group of magenta color (M), and a yellow particle group of yellow color (Y). Alternatively, the particle groups may be composed of a red particle group of red color (R), a green particle group of green color (G), and a blue particle group of blue color (B). Thus, color display is achieved in the image display medium.

Moreover, as the particle groups, particle groups whose color forming properties in dispersed state vary with kind may be used.

In the image display medium of the invention, another insulating particles having a color different from that of the above-described particle groups may be enclosed between the pair of substrates to dispose the insulating particles in the direction generally normal to the opposing direction of the pair of substrates with a gap which the particles of the particle groups can pass through.

As aforementioned, insulating particles having a color different from that of each particle group of the plurality of kinds of particle groups enclosed in the space between the pair of substrates are disposed in the direction generally normal to the opposing direction of the pair of substrates with a gap which the particles of the particle groups can pass through, thus the insulating particles allows to exhibit a color different from that of the plurality of kinds of particle groups having different colors.

The image display device of the invention comprises an image display medium comprising: a pair of substrates at least one of which having translucency, the substrates being disposed opposite to each other with a gap therebetween; a dispersion medium that has translucency and is enclosed between the pair of substrates; and plural particle groups that are movably dispersed in the dispersion medium, move according to an electric field, and with respective particle groups having different colors and requiring different forces for separation from the substrates and an electric field generation unit for forming an electric field between the pair of substrates at an intensity according to the particle group to be moved.

The electric field generation unit forms an electric field at an intensity according to the color particle to be moved from one substrate to the other substrate, so that the desired color particle group is selectively moved.

As a result of this, a sharp color display is achieved with reducing the deterioration of the image quality.

The writing device of the invention comprises: a voltage application unit that applies a voltage to between a pair of substrates of an image display medium, the image display medium comprising: the pair of substrates at least one of which having translucency, the substrates being disposed opposite to each other with a gap therebetween; a dispersion medium that has translucency and is enclosed between the pair of substrates; and plural particle groups that are movably dispersed in the dispersion medium, move according to an electric field, and with respective particle groups having different colors and requiring different forces for separation from the substrates; an acquisition unit for obtaining display image information containing display color information indicating an image color to be displayed on the display image medium; a memory unit for memorizing the display color sequence information indicating an image color to be displayed on the image display medium, particle color information, polarity information, and driving voltage information corresponding to each of the particle color information with correlating them each other; and a control unit for controlling the voltage application unit so as to read the driving voltage information corresponding to the display color information contained in the display image information obtained by the acquisition unit, and apply the driving voltage according to the obtained driving voltage information.

The displaying method of the invention employs an image display device that comprises: an image display medium, the image display medium comprising: a pair of substrates at least one of which has translucency, the substrates being disposed opposite to each other with a gap therebetween; a dispersion medium that has translucency and is enclosed between the pair of substrates; and plural particle groups that are movably dispersed in the dispersion medium and move according to an electric field, with respective particle groups having different colors and requiring different forces for separation from the substrates, the plural particle groups comprising a first particle group colored in a predetermined first color, a second particle group colored in a second color different from the first particle group and requiring a smaller force for separation from the substrate than the first particle group, and a third particle group colored in a third color different from the first and second particle groups and requiring a smaller force for separation from the substrate than the first particle group and the second particle group; and an electric field generation unit that forms an electric field between the pair of substrates of the image display medium;

forming an electric field between the substrates at an intensity that moves the first, second, and third particle groups to one substrate of the pair of substrates, thereby displaying a fourth color which is a subtractive color mixture of the first, second, and third colors;

while the fourth color is displayed, forming an electric field between the substrates at an intensity that moves the second and third particle groups from the one substrate to the other substrate, thereby displaying the first color;

while the first color is displayed, forming an electric field between the substrates at an intensity that moves the third particle group from the other substrate to the one substrate, thereby displaying a fifth color which is a subtractive color mixture of the first and third colors;

while the fourth color is displayed, forming an electric field between the substrates at an intensity that moves the third particle group from the one substrate to the other substrate, thereby displaying a sixth color which is a subtractive color mixture of the first and second colors;

forming an electric field between the substrates at an intensity that moves the first, second, and third particle group to the other substrate, and thereafter forming an electric field between the substrates at an intensity that moves the second and third particle groups from the other substrate to the one substrate, thereby displaying a seventh color which is a subtractive color mixture of the second and third colors;

while the seventh color is displayed, forming an electric field between the substrates at an intensity that moves the third particle group from the one substrate to the other substrate, thereby displaying the second color; and forming an electric field between the substrates at an intensity that moves the first, second, and third particle groups to the other substrate, and thereafter forming an electric field between the substrates at an intensity that moves the third particle group from the other substrate to the one substrate, thereby displaying the third color, wherein at least one of these processes is selected in order to perform display.

The first color is a yellow color, the second color is a magenta color, and the third color is a cyan color.

The present invention is further described below.

As shown in FIG. 1, an image display medium 12 according to the exemplary embodiment of the invention comprises a display substrate 20 used as the image display surface, a rear substrate 22 disposed opposite to the display substrate 20 with a gap, a gap member 24 for maintaining a predetermined gap between the substrates and dividing the space between the display substrate 20 and the rear substrate 22 into plural cells, and particle groups 34 enclosed in the cells.

The above-described cell refers to the region enclosed by the display substrate 20, the rear substrate 22, and the gap member 24. A dispersion medium 50 is enclosed in the cell. The particle groups 34 (described in detail later) are dispersed in the dispersion medium 50, and move between the display substrate 20 and the rear substrate 22 according to the intensity of an electric field formed in the cell.

Moreover, the image display medium 12 can be configured to allow the color display of each pixel by providing the gap member 24 corresponding to each pixel in an image displayed on the image display medium 12, and forming a cell corresponding to each pixel or several pixels.

In the display substrate 20, a supporting substrate 38, a surface electrode 40, and a surface layer 42 are layered in this order. In the rear substrate 22, a supporting substrate 44, a rear electrode 46, and a surface layer 48 are layered in this order.

Examples of the supporting substrate 38 and the supporting substrate 44 include glass and plastic such as polycarbonate resin, acrylic resin, polyimide resin, polyester resin, epoxy resin, and polyether sulfone resin.

Examples of the rear electrode 46 and the surface electrode 40 include oxides of indium, tin, cadmium, and antimony, complex oxides such as ITO, metals such as gold, silver, copper, and nickel, and organic conductive materials such as polypyrrole and polythiophene. These materials can be used as a single layer film, a mixture film, or a composite film, and can be formed by vapor deposition, sputtering, application or other appropriate methods. The thickness of a film formed by vapor deposition or sputtering is usually 100 to 2000 angstrom. The rear electrode 46 and the surface electrode 40 can be formed into a desired pattern, for example, matrix form or stripe form which allows passive matrix driving, by a conventionally known methods such as etching for conventional liquid crystal display elements or printed boards.

The surface electrode 40 may be embedded in the supporting substrate 38. In the same manner, the rear electrode 46 may be embedded in the supporting substrate 44. In this case, because the material of the supporting substrate 38 and the supporting substrate 44 may affect the charging characteristics and flowability of the each particle of the particle groups 34, it is properly selected in consideration of the composition and other properties of the particles of the particle groups 34.

The rear electrode 46 and the surface electrode 40 may be separated from the display substrate 20 and the rear substrate 22, respectively, and disposed outside the image display medium 12. In this case, the image display medium 12 is disposed between the rear electrode 46 and the surface electrode 40, thus the distance between the rear electrode 46 and the surface electrode 40 increases and the electric field intensity decreases. Accordingly, in order to obtain a desired intensity of electric field, it is necessary to decrease the thickness of the supporting substrate 38 and the supporting substrate 44 substrate or the distance between the supporting substrate 38 and the supporting substrate 44 in the display medium 12.

In the above-described case, the electrodes (surface electrode 40 and rear electrode 46) are provided on both the display substrate 20 and the rear substrate 22, but an electrode may be provided on either of which.

In order to allow active matrix driving, the supporting substrate 38 and the supporting substrate 44 may have a TFT (thin-film transistor) for each pixel. TFT is preferably formed not on the display substrate but on the rear substrate 22 from the viewpoint of easiness of lamination of wiring and mounting of components.

When the image display medium 12 is driven by a passive matrix system, the configuration of the image display device 10 comprising the image display medium 12, which will be described later, can be simplified. On the other hand, when the image display medium 12 is driven by an active matrix system using TFT, the display speed is faster than that achieved by passive matrix driving.

When the surface electrode 40 and the rear electrode 46 are formed on the supporting substrate 38 and the supporting substrate 44, respectively, it is preferred, as necessary, to form the surface layer 42 and/or the surface layer 48 as a dielectric film on the surface electrode 40 and the rear electrode 46, respectively, to prevent the breakage of the surface electrode 40 and the rear electrode 46 and the leakage between the electrodes which can cause the coagulation of the particles of the particle groups 34.

Examples of the material of the surface layer 42 and/or the surface layer 48 include polycarbonate, polyester, polystyrene, polyimide, epoxy, polyisocyanate, polyamide, polyvinyl alcohol, polybutadiene, polymethyl methacrylate, copolymerized nylon, ultraviolet curing acrylic resin, and fluorocarbon resins and so on.

In addition to the above insulating materials, insulating materials enclosing a charge transporting substance can be used. When a charge transporting substance is enclosed, the charging properties of the particles is improved by the injection of an electric charge into the particles, and an excessive charge of the particles can be leaked to stabilize the charge of the particles.

Examples of the charge transporting substance include hole transporting substances such as hydrazone compounds, stilbene compounds, pyrazoline compounds, and aryl amine compounds, electron transporting substances such as fluorenone compounds, diphenoquinone derivatives, pyran compounds, and zinc oxide, and self-supporting resins having charge transporting properties.

Specific examples thereof include polyvinyl carbazole, and polycarbonate obtained by the polymerization of a specific dihydroxy aryl amine and bischloroformate as described in U.S. Pat. No. 4,806,443. Because the dielectric film may affect the charging characteristics and flowability of the particles, it is properly selected in consideration of the composition and other properties of the particles. The display substrate, which is one of the pair of substrates, is preferably made of a transparent material selected from the above materials because it must transmit light.

The gap member 24 for maintaining a gap between the display substrate 20 and the rear substrate 22 is formed in such a manner not to impair the transparency of the display substrate 20, and may be formed with a thermoplastic resin, a thermosetting resin, an electron radiation curing resin, a light curing resin, a rubber, a metal, or the like.

The gap member 24 is in cell form or particle form. Examples of the cell-form gap member include nets. Nets are readily available and have a relatively uniform thickness, thus are useful for producing the image display medium 12 at a low cost. Nets are not suitable for displaying a fine image, but are preferably used in a large image display device which does not require high resolution. Examples of the cell form spacer include a sheet perforated in matrix form by etching, laser processing or the like. Such a sheet is easier to control the thickness, hole shape, hole size and the like than a net. Therefore, a sheet used in an image display medium is effective for displaying a fine image and improving contrast.

The gap member 24 may be integrated with either the display substrate 20 or the rear substrate 22. The supporting substrate 38, the supporting substrate 44, and the gap member 24 may be subjected to etching, laser processing, pressing with a premold die, printing or other treatments to form cell patterns of a desirable size.

In this case, the gap member 24 may be provided on either the display substrate 20 or the rear substrate 22, or both of them.

The gap member 24 may be colored or colorless, but is preferably colorless and transparent not to adversely affect the image which is displayed on the image display medium 12. In that case, for example, transparent resins such as polystyrene, polyester, and acryl resins or the like can be used as the member.

The gap member 24 in particle form is preferably transparent, and examples thereof include particles of transparent resins such as polystyrene, polyester and acryl resins, and glass particles.

In the dispersion medium 50 used in the image display medium 12 of the invention, plural kinds of particle groups 34 which have different colors and different forces for separation from the display substrate 20 and the rear substrate 22 (hereinafter may be referred to as force for separation) are dispersed.

The force for separation is calculated by subtracting the force to bind the particle groups 34 on the display substrate 20 or the rear substrate 22 (hereinafter referred to as binding force) from the electrostatic force of the particle groups 34, and is the force to detach the particles from the display substrate 20 and the rear substrate 22. The binding force is, for example, a magnetic force which acts on the particle groups, a flow resistance of particles due to the weak interparticle network, and van der Waals forces between particles and the display substrate 20 or the rear substrate 22.

More specifically, the force for separation of the particle groups 34 from the display substrate 20 and the rear substrate 22 represents the difficulty in the detachment of the particles of the particle groups 34 from the display substrate 20 and the rear substrate 22. The force for separation of the particle groups 34 from the display substrate 20 and the rear substrate 22 represents, in consideration that the particle groups 34 move according to the electric field formed between the substrates (between the display substrate 20 and the rear substrate 22), the difference in the electric field intensity at which the particles initiate moving in the dispersion medium 50.

Thus, the particles of the particle groups 34 initiates moving from either the display substrate 20 or the rear substrate 22 for the other substrate at different intensities of the electric field.

Examples of the particles of the plurality kinds of particle groups 34, which have different electric field intensity to initiate moving, include glass beads, particles of insulating metal oxides such as alumina and titanium oxide, thermoplastic or thermosetting resin particles, these resin particles having colorants attached to the surface, thermoplastic or thermosetting resin particles containing insulating colorants, and metal colloid particles having the color strength due to the surface plasmon resonance.

Examples of the thermoplastic resin used to produce the particles include homopolymers or copolymers of styrenes such as styrene and chlorostyrene, monoolefins such as ethylene, propylene, butylene, and isoprene, vinyl esters such as vinyl acetate, vinyl propionate, vinyl benzoate, and vinyl butyrate, $\alpha$-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate, vinyl ethers such as vinyl methyl ether, vinyl ethyl ether, and vinyl butyl ether, and vinyl ketones such as vinyl methyl ketone, vinyl hexyl ketone, and vinyl isopropenyl ketone.

Examples of the thermosetting resin used to produce the particles include crosslinked copolymers mainly composed of divinyl benzene, crosslinked resins such as crosslinked polymethyl methacrylate, phenolic resin, urea resin, melamine resin, polyester resin, and silicone resin. Examples of the typical binding resin include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester, polyurethane, epoxy resin, silicone resin, polyamide, denatured rosin, and paraffin wax.

As the colorant, organic or inorganic pigments, and oil-soluble dyes can be used. Examples thereof include known colorants such as magnetic powder such as magnetite and ferrite, carbon black, titanium oxide, magnesium oxide, zinc oxide, phthalocyanine copper-based cyan coloring materials, azo-based yellow coloring materials, azo-based magenta coloring materials, quinacridone-based magenta coloring materials, red coloring materials, green coloring materials, and blue coloring materials. Specific examples thereof include aniline blue, chalcoil blue, chromium yellow, ultramarine blue, Du Pont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3.

Moreover, air-contained porous sponge-like particles and hollow particles can be used as white particles.

Charge controlling agents may be added to the resin particles as necessary. As the charge controlling agent, known agents used for electrophotographic toner materials can be used, and examples thereof include cetylpyridyl chloride, quaternary ammonium salts such as trade names: BONTRON P-51, BONTRON P-53, BONTRON E-84, BONTRON E-81 (manufactured by Orient Chemical Industries, Ltd.), salicylic acid-based metal complexes, phenol-based condensates, tetraphenyl-based compounds, metal oxide particles, and metal oxide particles surface-treated with various coupling agents.

Magnetic materials may be added to the inside or surface of the particles as necessary. As the magnetic material, organic and inorganic magnetic materials, which are color coated as appropriate, are used. Moreover, transparent magnetic materials, particularly transparent organic magnetic materials are more preferred because they do not inhibit the color forming of coloring pigments, and have lower specific gravity than inorganic magnetic materials.

As the colored magnetic powder, for example, small diameter colored magnetic powder as described in Japanese Patent Application Laid-Open (JP-A) No. 2003-131420 can be used. A particle comprising a magnetic particle as core and a colored layer layered on the surface of the magnetic particle is used. The colored layer may be formed by impermeably coloring the magnetic powder with a pigment or the like, and, for example, a light-interference thin film is preferably used. The light-interference thin film is a thin film of an achromatic color material such as $SiO_2$ and $TiO_2$ having a thickness equivalent to light wavelength, and selectively reflects a specific wavelength of light by the light interference within the thin film.

An external additive can be added to the surface of the particles as necessary. The color of external additive is preferably transparent so as not to affect the particle color.

Examples of the external additive include inorganic particles of metal oxides such as silicon oxide (silica), titanium oxide, and alumina. In order to adjust the charging properties, flowability, environment-dependency of fine particles, these can be surface-treated by a coupling agent or silicone oil.

Examples of the coupling agent include those having positive charging properties, such as aminosilane-based coupling agents, aminotitanium-based coupling agents, and nitril-based coupling agents, and those having negative charging properties, such as nitrogen-free (composed of atoms other than nitrogen) silane-based coupling agents, titanium-based coupling agents, epoxy silane coupling agents, and acrylsilane coupling agents. Similarly, examples of the silicone oil include those having positive electrification nature, such as amino-denatured silicone oil, and those having negative charging properties, such as dimethyl silicone oil, alkyl-denatured silicone oils, $\alpha$-methyl sulfone-denatured silicone oils, methylphenyl silicone oils, chlorphenyl silicone oils, and fluorine-denatured silicone oils. These are selected depending on a desired resistance of the external additive.

Among these external additives, well-known hydrophobic silica and hydrophobic titanium oxide are preferred, and titanium compounds as described in JP-A No. 10-3177, which are obtained by the reaction between $TiO(OH)_2$ and a silane compound such as a silane coupling agent, are particularly preferred. As the silane compound, any one of chlorosilane, alkoxy silane, silazane, special silylating agents can be used. The titanium compounds are produced by reacting $TiO(OH)_2$ prepared by wet process with a silane compound or silicone oil, and drying. As the compounds are not passed through a sintering process at several hundred degrees, Ti molecules do not form a strong bond between them and cause no aggregation. Accordingly, the obtained particles are nearly primary particles. Moreover, as $TiO(OH)_2$ is directly reacted with a silane compound or silicone oil, the loading of the silane compound or silicone oil can be adjusted to control the charging characteristics, and a significantly higher charging ability than that of conventional titanium oxide can be imparted.

The primary particle of the external additive is generally 5 to 100 nm, preferably 10 to 50 nm, but not limited thereto.

The mixing ration between the external additive and the particles is appropriately adjusted in consideration of the particle size of the particles and the external additive. If the loading of the external additive is too much, a portion of the external additive is liberated from the particle surface and adheres to the surface of other particles, which will result in the failure to achieve desired charging characteristics. The loading of the external additive is usually 0.01 to 3 parts by weight, more preferably 0.05 to 1 parts by weight with reference to 100 parts by weight of the particles.

The external additive may be added to any one kind of the plurality of kinds of particles, or plural or all kinds of the particles. When the external additive is added to the surface of all the particles, it is preferred to strongly fix the external additive to the particle surface by embedding the external additive in the particle surface by an impact force, or by heating the particle surface. Such treatments prevent the liberation of the external additive from the particles and strong aggregation of the external additive having opposite polarity to form aggregates of the external additive which is difficult to dissociate by electric field, which in turn prevents the deterioration of image quality.

As the method to prepare the particles groups, any conventionally known methods may be used. For example, a method as described in JP-A No. 7-325434 can be used, wherein a resin, a pigment, and a charge controlling agent is weighed in a predetermined mixing ratio, and the pigment is added to and mixed the heated and melted resin, and the mixture is dispersed. The dispersion is cooled and ground into particles in a mill such as a jet mill, a hammer mill, and a turbo mill, and then the obtained particles are dispersed in a dispersion medium. In an alternative method, particles containing a charge controlling agent are prepared by a polymerization method such as suspension polymerization, emulsion polymerization, and dispersion polymerization, or other method such as coacervation, melt dispersion, and emulsion aggregation, and dispersed in a dispersion medium to obtain a particle dispersion liquid. Another method uses an appropriate device which is capable of dispersing and mixing a resin, a colorant, a charge controlling agent and materials of the dispersion medium at a temperature at which the resin is plasticizable, the dispersion medium does not boil, and lower than the decomposition point of a charge controlling agent and/or a colorant. Specifically, a pigment, a resin, and a charge controlling agent is mixed in a shooting star type mixer or a kneader, and heated to melt in a dispersion medium. The melt mixture is cooled with stirring, coagulated, and deposited to obtain particles utilizing the temperature dependency of the solvent solubility of the resin.

Moreover, there is another method wherein the above-described raw materials are put in an appropriate vessel equipped with a granular media for dispersion and mixing, for example, an attritor or a heated vibration mill such as a heated ball mill, and dispersed and mixed in the vessel at a temperature preferably in a range of, for example, 80 to 160° C. As the granular media, steels such as stainless steel and carbon steel, and alumina, zirconia, and silica are preferably used. For preparing the particles by the method, thoroughly mobilized raw materials are dispersed in the vessel with a granular media, and the dispersion medium is cooled to precipitate the resin containing the colorant from the dispersion medium. The granular media generates a shearing motion and/or an impact motion by keeping moving during and even after cooling to decrease the particle size.

As the particles of the particle groups 34 used in the image display medium 12 of the invention, metal colloid particles having the color strength due to the plasmon resonance may be used as the particles exhibiting different color forming properties in a dispersed state.

The metal of the metal colloid particles may be precious metal, copper or the like (hereinafter collectively referred to as "metal"). The precious metal is not particularly limited, and examples thereof include gold, silver, copper, ruthenium, rhodium, palladium, osmium, iridium, and platinum. Among these metals, gold, silver, copper, and platinum are preferred.

As the method to prepare the metal colloid particles, for example, a typical preparation method as described in a reference, "Kinzoku Nanoryushino Gosei, Chosei, Control Gijutsuto Oyotenkai (Synthesis, Preparation, and Control Technique of Metal Nanoparticles and Development of Applications)" (Technical Information Institute Co., Ltd., 2004) can be used. An example of the preparation is described below, but the method is not limited thereto.

The metal colloid particles are prepared by chemical methods wherein metal ions are reduced to metal atoms or metal clusters, then to nanoparticles, or physical method wherein a bulk metal is evaporated in an inert gas, and atomized metal is trapped with a cold trap or the like, or a metal is vacuum-deposited on a polymer thin film to form a metal thin film, and then the film is heated to break for dispersing the metal particles in a solid phase polymer. The chemical methods require no special apparatus and are advantageous for preparing the metal colloid particle of the invention.

The metal colloid particles are formed from the compound of the above metals. The metal compound is not particularly limited as long as it contains the above-described metal, and examples thereof include chlorauric acid, silver nitrate, silver acetate, silver perchlorate, platinic chloride, platinum potassium, copper chloride (II), copper acetate (II), and copper sulfate (II).

The metal colloid particles can be obtained as a dispersion liquid of metal colloid particles prepared by dissolving the metal compound in a solvent, reducing the compound into a metal, and protecting the metal with a dispersant. Alternatively, the metal colloid particles also can be obtained in the form of solid sol by removing the solvent of the dispersion liquid. The metal colloid particles may take either form.

When the metal compound is dissolved, a polymer pigment dispersant, which will be described later, may be used. By using the polymer pigment dispersant, stable metal colloid particles protected by the dispersant are obtained. In this case, the concentration of the dispersant adsorbed to the surface of the metal colloid particles can be controlled by using a polymer pigment dispersant of a desirable kind under desirable conditions (e.g., concentration and stirring time). More specifically, the amount of the polymer pigment dispersant adsorbed to the surface of the metal colloid particles can be increased by increasing the concentration or stirring of the polymer pigment dispersant. These treatments allow to control the mobility of the metal colloid particles.

When the metal colloid particles in the invention are used, they may be used as a dispersion liquid of the metal colloid particles obtained as described above, or as a solid sol obtained by removing the solvent and redispersing in other solvent. The metal colloid particles are not particularly limited in the invention.

When the metal colloid particles are used as a dispersion liquid, the solvent to prepare the liquid is preferably an insulating liquid which will be described later. When the solid sol is used after redispersion, the solvent to prepare the solid sol may be any solvent, and the solvent is not particularly limited. The solvent used for the redispersion is preferably an insulating liquid which will be described later.

The metal colloid particles can form various colors according to the kind, shape, volume average primary particle size of the metal. Accordingly, by using the particles of appropriate metal, shape, and volume average primary particle size, various color phases including the RGB color forming can be obtained, which achieves the color display medium of the image display medium 12 of the invention. Moreover, by controlling the shape and the particle size of the metal and resulting metal colloid particles, a RGB-type full color display medium is obtained.

The volume average primary particle size of the metal colloid particles for forming each color of the RGB type, or R, G, and B, is not particularly specified because the color forming also depends on the preparation conditions, shape, particle size or the like of the metal and particles. However, for example, for the case of gold colloid particles, R, G, and B colors are sequentially developed with the increase in the volume average primary particle size.

As the method to measure the volume average primary particle size in the invention, a laser diffraction scattering method is used, in which the particle groups is irradiated with laser beam, and the generated diffraction and the intensity distribution pattern of scattered light are used to measure the average particle size.

The content (% by mass) of the particle groups 34 with reference to the total weight in the cell is not particularly limited as long as it is on a level which can obtain a desired color phase. It is effective for the image display medium 12 to adjust the content according to the cell thickness. More specifically, the content may be decreased for a thick cell, or may be increased for a thin cell to obtain a desired color phase. The content is usually 0.01 to 50% by mass.

In the image display medium 12 of the invention, insulating particles 36 are enclosed in each cell. The insulating particles 36 are insulating particles having a color different from that of the particle groups 34 enclosed in the same cell. The particles of the particle groups 34 are each disposed with a passable gap in the direction generally normal to the opposing direction of the rear substrate 22 and the display substrate 20. Gaps are provided between the insulating particle 36 and the rear substrate 22, and between the display substrate 20 and the insulating particle 36, which allow to layer plural layers of the particles of the particle groups 34 enclosed in the same sell in the opposing direction of the rear substrate 22 and the display substrate 20.

More specifically, the particles of the particle groups 34 can move from the rear substrate 22 to the display substrate 20, or from the display substrate 20 to the rear substrate 22 through the gap between the insulating particles 36. The color of the insulating particle 36 is preferably, for example, white or black as a background color.

Examples of the insulating particles 36 include spherical particles of benzoguanamine-formaldehyde condensate, spherical particles of benzoguanamine-melamine-formaldehyde condensate, spherical particles of melamine-formaldehyde condensate (trade name: Epostar, manufactured by Nippon Shokubai Co., Ltd.), spherical fine particles of crosslinked polymethyl methacrylate containing titanium oxide (trade name: MBX-White, manufactured by Sekisui Plastics Co., Ltd.), spherical fine particles of crosslinked polymethyl methacrylate (trade name: Chemisnow MX, manufactured by Sohken Kagaku), fine particles of polytetrafluoroethylene (trade name: Lubron L, manufactured by Daikin Industries, Ltd., trade name: SST-2, manufactured by Shamrock Technologies Inc.); fine particles of carbon fluoride (trade name: CF-100, manufactured by Nippon Carbon Co., Ltd., trade names: CFGL, CFGM, manufactured by Daikin Kogyo); silicone resin fine particles (trade name: Tosspearl, manufactured by Toshiba Silicone K.K.); fine particles of polyester containing titanium oxide (trade name: Biryushea PL 1000 White T, manufactured by Nippon Paint Co., Ltd.); polyester-acrylic fine particles containing titanium oxide (trade name: Konac No. 1800 White, manufactured by NOF CORPORATION); spherical fine particles of silica (trade name: Hipresica, manufactured by UBE-NITTO KASEI Co., Ltd.) and the like.

The insulating particles are not limited to the above particles, but may be those obtained by dispersing a white pigment such as titanium oxide in a resin, grinding, and classifying into a desired particle size.

The insulating particles 36 have a volume average primary particle size of ⅕ to 1/50 the length of the opposing direction of the display substrate 20 and the rear substrate 22 so as to be provided between the display substrate 20 and the rear substrate 22 as described above, and the content of the insulating particles 36 must be 1 to 50% by volume with reference to the volume of the cell.

The dispersion medium 50 is preferably an insulating liquid.

As the insulating liquid, specifically, hexane, cyclohexane, toluene, xylene, decane, hexadecane, kerosene, paraffin, isoparaffin, mineral oil, olive oil, silicone oil, dichloroethylene, trichloroethylene, perchloroethylene, high purity kerosene, ethylene glycol, alcohols, ethers, esters, dimethylformamide, dimethyl acetamide, dimethyl sulfoxide, N-methylpyrrolidone, 2-pyrrolidone, N-methylformamide, acetonitrile, tetrahydrofuran, propylene carbonate, ethylene carbonate, benzine, diisopropyl naphthalene, olive oil, isopropanol, trichlorotrifluoroethane, tetra chloroethane, dibromotetrafluoroethane, and mixtures thereof can be appropriately used.

Water (or pure water) can be appropriately used as a dispersion medium by removing impurities to achieve the later-described volume resistance. The volume resistance is preferably $10^3$ Ωcm or more, more preferably $10^7$ Ωcm to $10^{19}$ Ωcm, further preferably $10^{10}$ Ωcm to $10^{19}$ Ωcm. By achieving such volume resistance, the generation of bubbles due to the electrode reaction of the liquid is more effectively reduced, and the electrophoresis characteristics of the particle are not impaired at every conduction, which imparts excellent repeating stability to the particles.

As necessary, an acid, an alkali, a salt, a dispersion stabilizer, a stabilizer for preventing oxidation or absorbing ultraviolet light, an antibacterial agent, a preservative or the like may be added to the insulating liquid, and the content is preferably in the range which results in the specific volume resistance value as described above.

Moreover, an anion surfactant, a cation surfactant, an amphoteric surfactant, a nonionic surfactant, a fluorine-based surfactant, a silicone-based surfactant, a metallic soap, an alkyl phosphoric acid ester, a succinic acid imide or the like may be added to the insulating liquid as a charge controlling agent.

Examples thereof include ionic or nonionic surfactants, block or graft copolymers composed of lipophilic and hydrophilic moieties, compounds having a polymer chain backbone, such as cyclic, star-shaped, or dendritic polymers (dendrimers), and compounds selected from metal complexes of salicylic acid, metal complexes of catechol, metal-containing bisazo dyes, tetraphenyl borate derivatives or the like.

Specific examples of the surfactant include nonionic surfactants such as polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, and fatty acid alkylol amide; anion surfactants such as alkylbenzene sulfonate, alkylphenyl sulfonate, alkylnaphthalene sulfonate, higher fatty acid salts, sulfate ester salts of higher fatty acid esters, and sulfonic acids of higher fatty acid esters; and cationic surfactants such as primary to tertiary amine salts, and quaternary ammonium salts. The content of such charge controlling agent is preferably 0.01% by weight or more and 20% by weight or less, most preferably 0.05 to 10% by weight with reference to the particle solid content. If the content is less than 0.01% by weight, satisfactory charge control effect cannot be achieved, and if exceeds 20% by weight, the conductivity of the developer is excessively increased to impair the usability of the developer.

The particle groups 34 enclosed in the image display medium 12 of the invention is also preferably dispersed as a dispersion medium 50 in the polymer resin in the image display medium 12. The polymer resin is preferably a polymer gel or the like.

Examples of the polymer resin include polymer gel derived from natural polymer, such as agarose, agaropectin, amylose, sodium alginate, propyleneglycol alginate ester, isolichenan, insulin, ethyl cellulose, ethylhydroxyethyl cellulose, curdlan, casein, carrageenan, carboxymethyl cellulose, carboxymethyl starch, callose, agar, chitin, chitosan, silk fibroin, Cyamoposis Gum, pyrus cydonia seed, crown gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethyl cellulose, hydroxypropyl cellulose, pustulan, funoran, decomposed xyloglucan, pectin, porphyran, methyl cellulose, methyl starch, laminaran, lichenan, lenthinan, and locust bean gum; and synthetic polymer including nearly all kinds of polymer gels.

Another examples include polymers containing functional groups such as alcohol, ketone, ether, ester, and amide in the repeating units, such as, polyvinyl alcohol, poly(meth)acrylamide and derivatives thereof, polyvinyl pyrrolidone, polyethylene oxide and copolymers containing these polymers.

Among them, gelatin, polyvinyl alcohol, and poly(meth)acrylamide are preferably used from the viewpoints of production stability and electrophoresis characteristics.

These polymer resins are preferably used as a dispersion medium 50 together with the insulating liquid.

The size of the cell in the image display medium 12 of the invention is usually 10 μm to 1 mm. The cell size is in a close relationship with the resolution of the image display medium 12, and the smaller the cell, the higher the resolution of the display medium.

For fixing the display substrate 20 and the rear substrate 22, fixing units such as a combination of bolts and nuts, a clamp, a clip, and a frame for fixing substrate can be used. Moreover, fixing media such as adhesion, heat fusion, ultrasonic bonding can be used.

The image display medium 12 can be used for bulletin boards, circulars, electronic whiteboards, advertisements, signboards, blinking markers, electronic paper, electronic newspaper, and electronic books on which images can be stored and rewritten, and document sheets which can be shared between copiers and printers.

The image display medium 12 displays different colors by varying the electric field intensity (potential difference (V/m) per unit distance) between the display substrate 20 and the rear substrate 22.

The image display medium 12 of the invention can display colors corresponding to each pixel of the image data in each cell corresponding to each pixel of the image display medium 12 by moving according to the electric field formed between the display substrate 20 and the rear substrate 22.

As described above, in the particle groups 34 according to the present exemplary embodiment, the color particles have different forces for separation from the display substrate 20 and the rear substrate 22, and the particles of the particle groups 34 initiate moving from either the display substrate 20 or the rear substrate 22 to the other substrate at different electric field intensities.

The "electric field intensity" refers to the potential difference (V/m) per unit distance. More specifically, the difference in the electric field intensity means the difference in the electric field intensity required for the color particles of the particle groups 34 to move from one of the display substrate 20 or the rear substrate 22 to the other substrate.

The color particles of the particle groups 34 are preferably different in the range of the potential difference required for moving them.

The "range of the potential difference required for moving the particle groups 34" refers to the range from the potential difference between the substrates for forming an electric field intensity required to initiate movement of the particles composing the particle groups 34 (hereinafter may be referred to as "potential difference required to initiate movement of the particles") to the maximum potential difference.

The "potential difference required to initiate movement of the particles" refers to the potential difference between the substrates due to the voltage applied to the space between the display substrate 20 and the rear substrate 22 for forming an electric field having an electric field intensity required to initiate movement of the particle groups 34, and refers to, when the voltage applied to the space between the display substrate 20 and the rear substrate 22 is continuously changed to change the potential difference, the potential difference at the point where the display density of the image display medium 12 is changed by the movement of the color particles of the particle groups 34.

Further, the "maximum potential difference" refers to the potential difference between the substrates at the point where the display density does not change, becoming saturated, even though the voltage applied to the space between the substrates and the voltage application time are further increased from the above-described point of initiation of movement.

The "change in the display density" refers to the boundary state at which the amount of change in the density of the display substrate 20, which is measured using a densitometer (X-Rite404A, manufactured by X-Rite), is increased from less than 0.01 to 0.01 or more when a voltage is applied to the surface electrode 40 and the rear electrode 46 of the image display medium 12 and the voltage level of this voltage is increased or decreased from 0V.

The relationship between the potential difference per unit distance of the plural particle groups 34 used in the image display medium 12 of the invention and the change in the display density with the movement of the color particles of the particle groups 34 between the substrates is specifically illustrated with reference to FIG. 2.

The present exemplary embodiment is based on the assumption that, as shown in FIG. 1, the particle groups 34 composed of three color particle groups, the magenta particle group 34M of a magenta color, the cyan particle group 34C of a cyan color, and the yellow particle group 34Y of a yellow color are enclosed in the same cell of the image display medium 12.

In the following description, the relationship between the absolute values of the potential difference Vtc, −Vtc, Vdc, −Vdc, Vtm, −Vtm, Vdm, −Vdm, Vty, −Vty, Vdy, and −Vdy is expressed by |Vtc|<|Vdc|<|Vtm|<|Vdm|<|Vty|<|Vdy|.

Further, according to the present exemplary embodiment, the magenta particle group 34M of magenta color, cyan particle group 34C of cyan color, and yellow particle group 34Y of yellow color are used as the particles of the particle groups 34 which initiate separating from either of the display substrate 20 or the rear substrate 22 to the other substrate at different electric field intensities are the three color particle groups, and the absolute value of the potential difference between the substrates at the point where the magenta particle group 34M of a magenta color, the cyan particle group 34C of a cyan color, and the yellow particle group 34Y of a yellow color initiate moving is expressed by |Vtm|, |Vtc|, and |Vty|, respectively. In addition, the maximum potential differences of the magenta particle group 34M of a magenta color, the cyan particle group 34C of a cyan color, and the yellow particle group 34Y of a yellow color composing the particle groups 34 are expressed as |Vdm|, |Vdc|, and |Vdy|, respectively.

When a voltage is applied to the space between the display substrate 20 and the rear substrate 22 with the voltage level being gradually increased from 0 V such that the potential difference due to the voltage applied to the space between the substrates exceeds +Vtc, the display density starts to change with the movement of the cyan particle group 34C in the image display medium 12. When the voltage level is further increased to increase the potential difference such that the potential difference due to the voltage applied to the space between the substrates becomes +Vdc, the change in the display density with the movement of the cyan particle group 34C in the image display medium 12 ceases.

When the voltage level is further increased such that the potential difference due to the voltage applied to the space between the display substrate 20 and the rear substrate 22 exceeds +Vtm, the display density starts to change with the movement of the magenta particle group 34M in the image display medium 12. When the voltage level is further increased to increase the potential difference such that the potential difference due to the voltage applied to the space between the display substrate 20 and the rear substrate 22 becomes +Vdm, the change in the display density due to the movement of the magenta particle group 34M in the image display medium 12 ceases.

When the voltage level is further increased such that the potential difference due to the voltage applied to the space between the substrates exceeds +Vty, the display density starts to change with the movement of the yellow particle group 34Y in the image display medium 12. When the voltage level is further increased to increase the potential difference such that the potential difference due to the voltage applied to the space between the substrates becomes +Vdy, the change in the display density with the movement of the yellow particle group 34Y in the image display medium 12 ceases.

On the other hand, when a negative pole voltage is applied to the space between the display substrate 20 and the rear substrate 22 with the absolute value of the voltage being gradually increased from 0 V such that the potential difference due to the voltage applied to the space between the substrates exceeds the absolute value of the voltage level −Vtc, the display density starts to change with the movement of the cyan particle group 34C between the substrates in the image display medium 12. When the absolute value of the voltage level is further increased such that the potential difference due to the voltage applied to the space between the display substrate 20 and the rear substrate 22 becomes −Vdc or more, the change in the display density with the movement of the cyan particle group 34C in the image display medium 12 ceases.

When a negative pole voltage is applied at a higher absolute value of the voltage level such that the potential difference due to the voltage applied to the space between the display substrate 20 and the rear substrate 22 exceeds the absolute value of −Vtm, the display density starts to change with the movement of the magenta particle group 34M in the image display medium 12. When the absolute value of the voltage level is further increased such that the potential difference due to the voltage applied to the space between the display substrate 20 and the rear substrate 22 becomes −Vdm, the change in the display density with the movement of the magenta particle group 34M in the image display medium 12 ceases.

When a negative pole voltage is applied at a higher absolute value of the voltage level such that the potential difference due to the voltage applied to the space between the display substrate 20 and the rear substrate 22 exceeds the absolute value of −Vty, the display density starts to change with the movement of the yellow particle group 34Y in the image display medium 12. When the absolute value of the voltage level is further increased such that the potential difference due to the voltage applied to the space between the substrates becomes −Vdy, the change in the display density with the movement of the yellow particle group 34Y in the image display medium 12 ceases.

Figure 2:
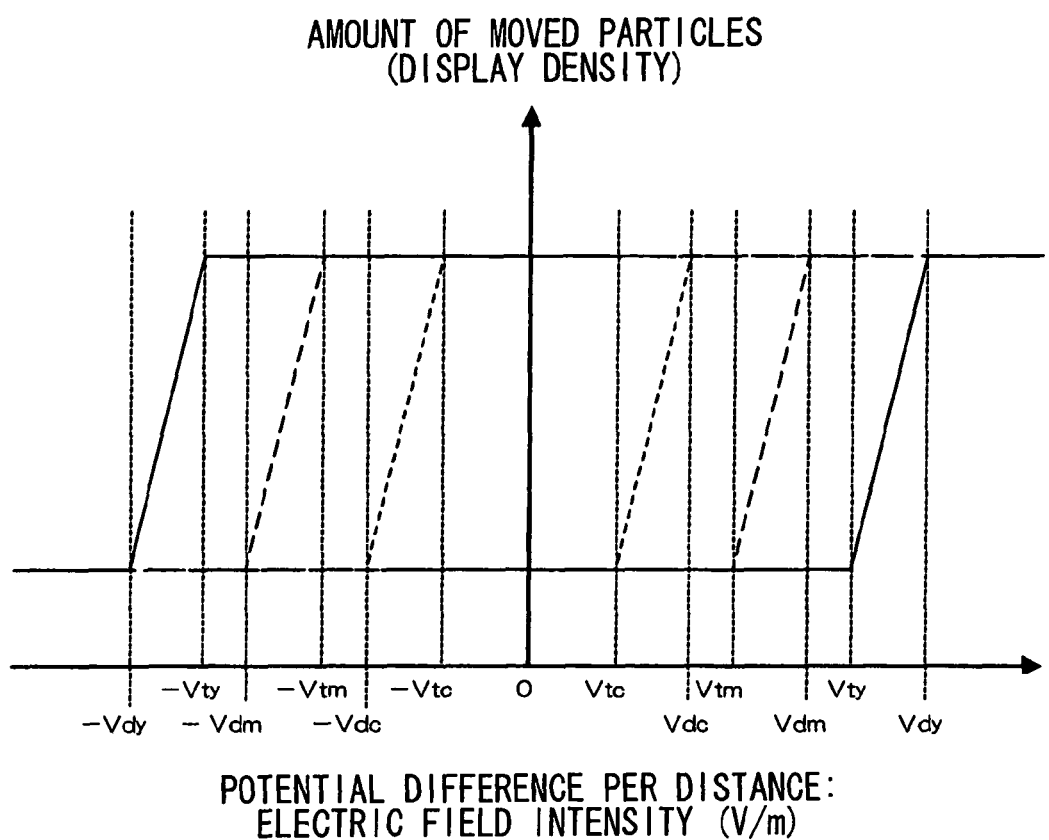
FIG. 2 is a diagram schematically showing the relationship between the potential difference (electric field intensity) per unit distance and the amount of particle movement.

More specifically, according to the present exemplary embodiment, as shown in FIG. 2, when a voltage is applied to the space between the display substrate 20 and the rear substrate 22 such that the potential difference between substrates falls within a range from −Vtc to Vtc (potential difference |Vtc| or less), it can be regarded that there is no movement of the particles of the particle groups 34 (cyan particle group 34C, magenta particle group 34M, and yellow particle group 34Y) to change the display density of the image display medium 12. When a potential difference occurs between the substrates at an absolute value higher than that of +Vtc and −Vtc, among the three color particles of the particle groups 34, the cyan particle group 34C initiates moving for changing the display density of the image display medium 12 to change the display density per unit voltage. When a potential difference occurs at an absolute value of |Vdm| or more, which is the absolute value of the potential difference −Vdc and Vdc, no change occurs in the display density per unit voltage.

Further, when a voltage is applied to the space between the display substrate 20 and the rear substrate 22 such that the potential difference between substrates falls within a range from −Vtm to Vtm (potential difference |Vtm| or less), it can be regarded that there is no movement of the magenta particle group 34M and the yellow particle group 34Y to change the display density of the image display medium 12. When a potential difference occurs between the substrates at an absolute value higher than that of +Vtm and −Vtm, among the magenta particle group 34M and the yellow particle group 34Y, the magenta particle group 34M initiates moving for changing the display density of the image display medium 12 to change the display density per unit voltage. When a potential difference occurs at an absolute value of |Vdm| or more, which is the absolute value of the potential difference −Vdm and Vdm, no change occurs in the display density per unit voltage.

Further, when a voltage is applied to the space between the display substrate 20 and the rear substrate 22 such that the potential difference between substrates falls within a range from −Vty to Vty (potential difference |Vty| or less), it can be regarded that there is no movement of the yellow particle group 34Y to change the display density of the image display medium 12. When a potential difference occurs between the substrates at an absolute value higher than that of +Vty and −Vty, the yellow particle group 34Y initiates moving for changing the display density of the image display medium 12 to change the display density per unit voltage. When a potential difference occurs at an absolute value of |Vdy| or more, which is the absolute value of the potential difference −Vdy and Vdy, no change occurs in the display density per unit voltage.

Accordingly, the color particles of the particle groups 34 dispersed in the dispersion medium 50 of the image display medium 12 of the invention preferably initiate moving from one substrate to the other substrate at different electric field intensities, and, as described above, preferably require different ranges of the potential difference to initiate moving.

The electric field intensity to initiate moving of the particle groups 34 of each color is determined by the electrostatic force of the color particles of the particle groups 34 and the power to bind the particle groups 34 of each color to either the display substrate 20 or the rear substrate 22 (hereinafter referred to as the binding force). The higher the absolute value of the difference between the electrostatic force and the binding force, the higher the electric field intensity. In addition, the smaller the absolute value of the difference between the electrostatic force and the binding force, the smaller the electric field intensity.

The next section describes the method for varying the electric field intensity to initiate moving, and the range of the potential difference required for moving among the color particles of the particle groups 34.

In the first place, the power acting as the binding force is described below. When the plural particle groups 34 adhere to either of the display substrate 20 or the rear substrate 22, the adhesion force for adhering to the display substrate 20 or the rear substrate 22 is acting on between the substrate and the particles of the particle groups 34. The adhesion force is a van der Waals force intrinsic to a substance generated by physical contact. The force varies depending on the contact area between the particles and the substrate, and the distance between the particles and the substrate. The force becomes larger as the contact area increases and the distance decreases. The contact area and the distance vary depending on the particle size (volume average primary particle size) and the shape factor of the particles. The van der Waals force also varies depending on the material of the particles and the substrate surface.

When the particles is charged, an image force is generated between the display substrate 20 or the rear substrate 22 to which the particles are attached, however the image force is said to be smaller than other forces.

When the particles are magnetized, a magnetic force acting on the particle groups is generated between the display substrate 20 or the rear substrate 22 and the particles in the vicinity of the display substrate 20 and the rear substrate 22. In this case, a magnet is provided on the display substrate 20 or the rear substrate 22 such that a magnetic gradient based on the magnetic field gradient from the magnet is generated in the vicinity of the display substrate 20 or the rear substrate 22 to exert a magnetic force on the particles in the vicinity of the display substrate 20 or the rear substrate 22.

Further, when the plural particle groups 34 dispersed in the dispersion medium 50 initiate moving upon application of an electric field to the space between the display substrate 20 and the rear substrate 22, a resistance is generated at the interface between the surface of the particles and the dispersion medium 50. The resistance is considered to be generated due to the correlation (network, association) formed between the particles accumulated on and in the vicinity of the substrate surface. The resistance becomes largest when the particles initiate moving, and gradually decreases with the movement of the particles. For example, the color particles of the particle groups 34 accumulated on the rear substrate 22 form a loose network in the dispersion medium 50, and, from a microscopic viewpoint, increase the viscosity around the particles of the particle groups 34, which generates a resistance when the particles initiate moving.

Hereinafter the maximum resistance at the interface between the dispersion medium 50 and the particles of the particle groups 34 (the resistance value at the initiation of movement) is referred to as "flow resistance". The flow resistance is also considered to contribute to the binding force.

Therefore, in plural kinds of particle groups 34 which are dispersed in the dispersion medium 50 of the image display medium 12 and have different colors, the electric field intensity at which the particles initiate moving can be varied between the groups of the particle groups 34 by, as described above, adjusting the force for separation of the particles of the particle groups 34 (electrostatic force−binding force). For this purpose, the average charge, the flow resistance to the dispersion medium on the particle surface, the average quantity of magnetism (intensity of magnetization), the particle size, and the shape factor of the particles are adjusted alone or in combination thereof for each group of the particle groups.

More specifically, the particle groups 34 composed of particle groups having different electric field intensity to initiate moving can be prepared by varying one or plural factors selected from the average charge, the flow resistance to the dispersion medium on the particles surface, the average quantity of magnetism (intensity of magnetization), the particle size, and the shape factor of the particles between the particle groups, and equating the remaining factors between them.

Since the particle groups 34 move in the dispersion medium 50, when the viscosity of the dispersion medium 50 is a specified value or higher, the particle groups significantly vary in the adhesion force to the rear substrate 22 and the display substrate 20, and are hard to adjust such that they initiate moving at different electric field intensities. Therefore, the viscosity of the dispersion medium 50 also requires adjustment.

The average charge of the particles composing each particle group of the particle groups 34 (magenta particle group 34M, cyan particle group 34C, and yellow particle group 34Y) can be adjusted, specifically, by appropriately controlling the kind and amount of the charge controlling agent added to the above-described resin, the kind and amount of the polymer chain to be combined with the particle surface, the kind and amount of the external additive to be added to or embedded in the particle surface, the kind and amount of the surfactant, polymer chain, and coupling agent added to the particle surface, the specific surface area of the particles (volume average primary particle size and particle shape factor) and other factors.

The binding force and the force for separation can be adjusted by adjusting the average surface roughness of the surface layer 42 and the surface layer 48 of the display substrate 20 and the rear substrate 22, respectively.

The flow resistance of the particle surfaces against the dispersion medium can be adjusted by appropriately adjusting the kind or amount of the substance to be added on or in the vicinity of the particle surfaces. Alternatively, the flow resistance can be adjusted by appropriately adjusting the vibrating frequency applied by the display substrate 20 and the rear substrate 22 to the particles on and in the vicinity of the display substrate 20 and the rear substrate 22.

The flow resistance of the particle groups 34 can be adjusted specifically by modifying the surface of the particles composing the particle groups 34 with a compound containing a long-chain alkyl group. The flow resistance can be adjusted by varying the carbon number of the long-chain alkyl group or the amount of the surface modification with the compound containing a long-chain alkyl group among the particle groups.

Specific examples of the compound containing a long-chain alkyl group include paraffins such as triacontane, octacosane, heptacosane, hexacosane, tetracosane, docosane, heneicosane, and eicosane, alkoxysilanes such as octadecyltriethoxysilane, diethoxymethyloctadecylsilane, dodecyltriethoxysilane, octyltriethoxysilane, decyltrimethoxysilane, and hexyltriethoxysilane, chlorosilanes such as docosylmethyldichlorosilane, docosyltrichlorosilane, dimethyloctadecylchlorosilane, methyloctadecyldichlorosilane, octadecyltrichlorosilane, tetradecyltrichlorosilane, dodecyltrichlorosilane, and decyltrichlorosilane, and silazanes such as hexamethyldisilazane. In cases where the dispersion medium is silicone oil, it is preferable to use octadecyltriethoxysilane, diethoxymethyloctadecylsilane, dodecyltriethoxysilane, or decyltrimethoxysilane because they readily takes in the silicone oil to form a network.

Alternatively, the flow resistance of the surface of the particles to the dispersion medium 50 may be controlled by coating the surface of the particles with a low molecular weight gelling agent in the dispersion medium 50 with the coating amount or the kind of the low molecular weight gelling agent varied among the particle groups of the particle groups 34. Using the method, the flow resistance can be individually adjusted for each particle group of the particle groups 34 through the network (association) formed by the low molecular weight gelling agent on the surface of the particles.

Specific examples of the low molecular weight gelling agent include dibenzylidene-D-sorbitol, 12-hydroxystearic acid, N-lauroyl-L-glutamic acid-α, γ-bis-N-butylamide, spin-labeled steroid, cholesterol derivatives, aluminum dialkylphosphate, L-isoleucine derivatives, L-valine derivatives, L-lysine derivatives, cyclic dipeptide derivatives, cyclohexane diamine derivatives, dibenzoyl urea derivatives, fluorine-containing diester compounds, long-chain alkyl-modified silicone, and carboxylate polyvalent metal salt-modified organosiloxane. Among them, L-isoleucine derivatives and L-valine derivatives are preferable because they readily take in silicone oil to form a network when silicon oil is used as the dispersion medium.

The flow resistance can be measured by applying an electric field to the space between the display substrate 20 and the rear substrate 22 to accumulate the particles, for example, at the surface of and in the vicinity of the rear substrate 22, subsequently applying an electric field to the opposing display substrate, and measuring the voltage at the point where the particles begin to move. The measurement is conducted under conditions where the adhesion force between the particles and the rear substrate 22 is small.

The "small adhesion force" specifically means that the substrate surface has a low surface energy.

The average quantity of magnetism of the particles can be adjusted, specifically, by various methods for magnetizing particles.

For example, in the same manner as conventional electrophotographic magnetic toner, a magnetic substance such as powder magnetite is mixed with a resin to produce particles, or a magnetic substance and a monomer are dispersed together, and then the dispersion is polymerized to produce particles. Alternatively, a magnetic substance is deposited in the fine pores of hollow particles to produce particles. Coating of a magnetic substance is also known. For example, polymerization is initiated from active points provided on the surface of a magnetic substance to produce particles composed of the magnetic substance coated with a resin, or a dissolved resin is deposited on the surface of a magnetic substance to produce particles composed of the magnetic substance coated with the resin. The magnetic substance may be a lightweight, transparent or colored organic magnetic substance. The average quantity of magnetism of the particles can be adjusted by appropriately adjusting the kind and amount of the magnetic substance to be used. Gold nanofine particles coated with a polymer (polyallyl amine hydrochloride), which is known to have ferromagnetism, also may be used.

The display substrate and the rear substrate may be slightly magnetized to adjust the magnetic force acting on the particles, and to magnetically attract the magnetized particles. The display substrate is preferably composed of a transparent magnetic film which will not impair the transparency. Examples of known transparent magnetic films include a cobalt-added titanium dioxide thin film, an iron-substituted titanium oxide nanosheet, and a magnetic thin film of a prussian blue analog. Other examples include, though having no transparency, a flexible magnet thin film such as a highly flexible sheet magnet or monomolecular magnetic sheet composed of a rare earth magnetic substance.

The particle size is, specifically, adjusted when the particles are prepared. When the particles are prepared by polymerization, the particle size can be adjusted by appropriately adjusting the amount of the dispersant, dispersion conditions, heating conditions, and when the particles are prepared by mixing, grinding, and classifying, the particle size can be adjusted by appropriately adjusting the classification conditions or the like. When the constituents of the particles are prepared by milling with a ball mill, the size of steel balls used in the ball mill, the rotating time, the rotating speed and other conditions are appropriately adjusted. The method for the adjustment is not limited to those described above.

The shape factor of the particles is, specifically, for example, preferably adjusted by a method as described in JP-A No. 10-10775, wherein so-called suspension polymerization, in which a polymer is dissolved in a solvent, mixed with a colorant, and dispersed in an aqueous medium in the presence of an inorganic dispersant to obtain particles, is carried as follows: a monomer is added to a non-polymerizable organic solvent which is compatible with the monomer (not or slightly compatible with the solvent), and suspension-polymerized to obtain particles, and the particles are taken out and dried to remove the organic solvent. The drying method is preferably freeze drying, and the freeze drying is preferably carried out in a range of −10 to −200° C. (more preferably −30° C. to −180° C.). The freeze drying is carried out under a pressure of about 40 Pa or less, most preferably 13 Pa or less. The particle shape can be also controlled by the method as described in JP-A No. 2000-292971, wherein small particles are aggregated, unified, and enlarged to a desired particle size.

With the change in the shape factor of the particles, the specific surface area of the particles changes, and consequently, the chargeability of the particles may change to result in the change in the electrostatic force. In that case, the force of the color particles for separation from the substrates is adjusted by the combination effect of the binding force and the electrostatic force.

The average surface roughness of the surface layer 42 and the surface layer 48 of the display substrate 20 and the rear substrate 22 is adjusted by a mechanical method or a chemical method. Examples of the mechanical method include sandblasting, embossing, tooling, die stripping, and die transferring. Examples of the chemical method include light radiation, and drying with a combination of solvents having different drying speeds. The surface roughness of the substrate surface can be adjusted, for example, by applying a resin in which mixed particles of fluorine-based resins, polyamides or the like are dispersed. The average surface roughness can be appropriately adjusted by the methods as described above.

The average surface roughness is based on the ten-point average surface roughness Rz measured by the measuring method described in JIS B 0601. Typically, the roughness can be readily measured using a commercial stylus profilemeter (surface smoothness sensor).

Since the particle groups 34 move in the dispersion medium 50, when the viscosity of the dispersion medium 50 is a specified value or higher, the viscous resistance of the dispersion medium greatly contributes to movement of the particles, which hinders achieving the range of potential difference required for moving the particles at a desired electric field. Therefore, the viscosity of the dispersion medium 50 also requires adjustment.

The viscosity of the dispersion medium 50 is essential to be 0.1 mPa·s to 20 mPa·s at a temperature of 20° C. from the viewpoints of the moving velocity of the particles, or the display speed, and preferably 0.5 mPa·s to 5 mPa·s, more preferably 0.7 mPa·s to 2 mPa·s.

When the viscosity of the dispersion medium 50 is in the range of 0.1 mPa·s to 20 mPa·s, the variation in the adhesion force between the particle groups 34 dispersed in the dispersion medium 50 and the display substrate 20 or the rear substrate 22, the flow resistance, and the electrophoresis time can be reduced.

The viscosity of the dispersion medium 50 can be adjusted by appropriately adjusting the molecular weight, structure, composition, and the like of the dispersion medium. The viscosity can be measured with a viscometer (trade name: B-8L, manufactured by Tokyo Keiki Co., Ltd.).

Figure 3:
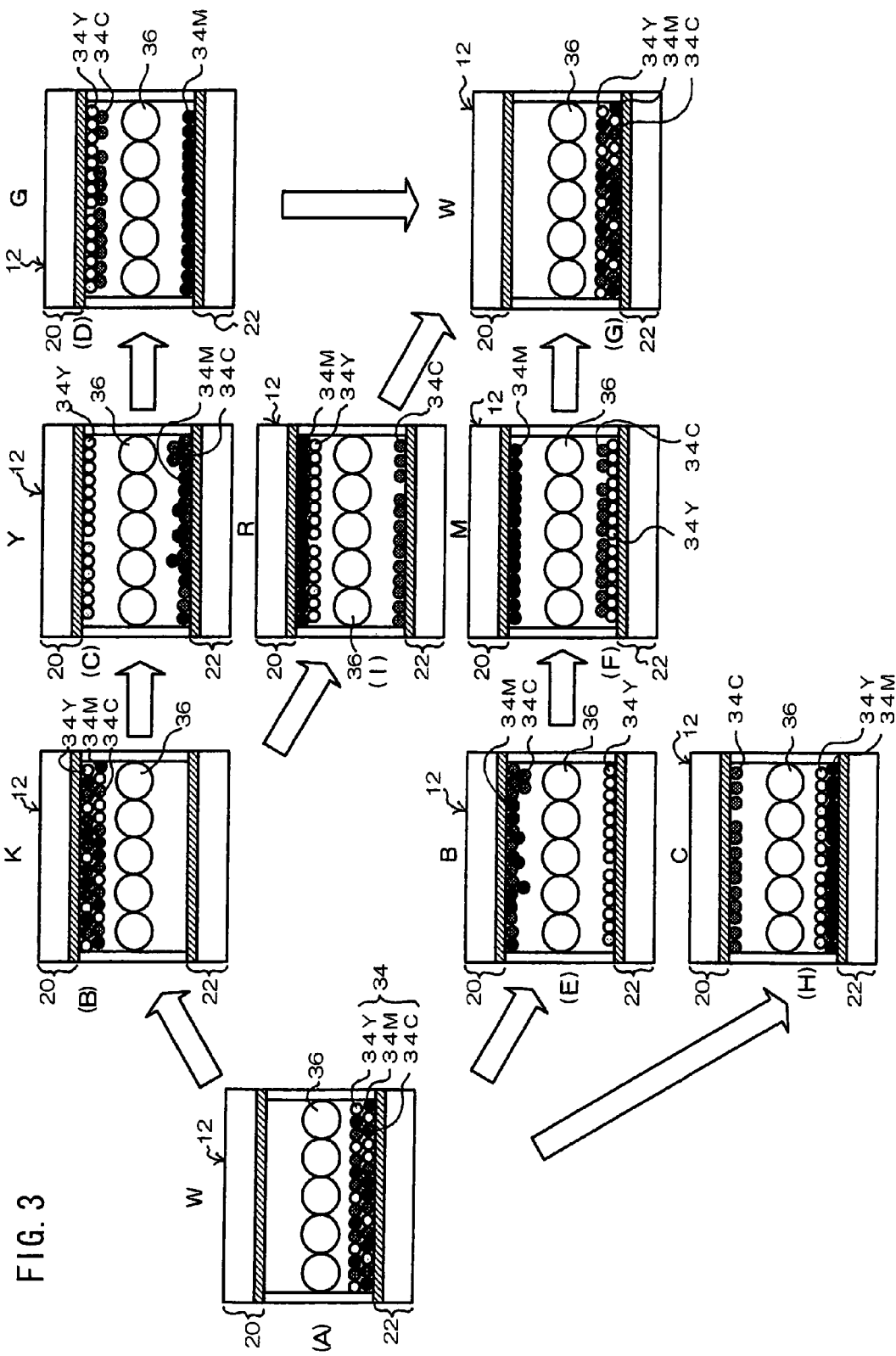
FIG. 3 is an explanatory drawing schematically showing the relationship between the embodiments of the formation of an electric field in the image display medium and the embodiments of particle movement.

The next section describes the mechanism of the particle movement when an image is displayed on the image display medium 12 of the invention, with reference to FIG. 3.

For example, as the plurality of kinds of particle groups which initiate moving at different intensities of electric field, as shown in FIG. 2, it is supposed that the yellow particle group 34Y as the particle group having the highest threshold, the magenta particle group 34M as the particle group having the second highest threshold following the yellow particle group 34Y, and the cyan particle group 34C as the particle group having the lowest threshold are enclosed in the image display medium 12.

Hereinafter, the electric field intensity required for inducing between the substrates a potential difference which is larger than the absolute value of the potential difference for forming an electric field intensity required for initiating movement of the particles composing the yellow particle group 34Y, and equal to or lower than the above-described maximum potential difference for the yellow particle group 34Y is referred to as "large electric field", the electric field intensity required for inducing between the substrates a potential difference which is larger than the absolute value of the potential difference for forming an electric field intensity required for initiating movement of the particles composing the magenta particle group 34M, and equal to or lower than the above-described maximum potential difference for the magenta particle group 34M is referred to as "medium electric field", and the electric field intensity required for inducing between the substrates a potential difference which is larger than the absolute value of the potential difference for forming an electric field intensity required for initiating movement of the particles composing the cyan particle group 34C, and equal to or lower than the above-described maximum potential difference for the cyan particle group 34C is referred to as "small electric field".

In cases where a higher voltage is applied to the display substrate 20 than that applied to the rear substrate 22 to provide a potential difference between the substrates, the electric field intensities are referred to as "+ large electric field", "+ medium electric field", and "+ small electric field", respectively. On the other hand, in cases where a higher voltage is applied to the rear substrate 22 than that applied to the display substrate 20 to provide a potential difference between the substrates, the electric field intensities are referred to as "− large electric field", "− medium electric field", and "− small electric field", respectively.

As shown in FIG. 3 (A), if the assumption is made that all the magenta particle group 34M, the cyan particle group 34C, and the yellow particle group 34Y are disposed on the side of the rear substrate 22 in the initial state, when a "+ large electric field" is formed between the display substrate 20 and the rear substrate 22, the magenta particle group 34M, the cyan particle group 34C, and the yellow particle group 34Y move to the display substrate 20. In such a state, even if the electric field is put to zero, each particle group of the particle groups does not move from the display substrate 20, and a black color remains displayed by the subtractive color mixture of the magenta particle group 34M, the cyan particle group 34C, and the yellow particle group 34Y (subtractive color mixture of magenta, cyan, and yellow colors) (see FIG. 3 (B)).

In the state as shown in FIG. 3 (B), if a "− medium electric field" is formed between the display substrate 20 and the rear substrate 22, of all the particle groups 34, the magenta particle group 34M and the cyan particle group 34C move to the rear substrate 22. Accordingly, only the yellow particle group 34Y remains on the display substrate 20, thus a yellow color is displayed (see FIG. 3 (C)).

Furthermore, in the state as shown in FIG. 3 (C), if a "+ small electric field" is formed between the display substrate 20 and the rear substrate 22, within the magenta particle group 34M and the cyan particle group 34C which moved to the rear substrate 22, the cyan particle group 34C moves from the rear substrate 22 to the display substrate 20. Accordingly, the yellow particle group 34Y and the cyan particle group 34C attach to the display substrate 20, thus a green color due to the subtractive color mixture of yellow and cyan is displayed (see FIG. 3 (D)).

In the state as shown in FIG. 3 (B), if a "− small electric field" is formed between the display substrate 20 and the rear substrate 22, of all the particle groups 34, the cyan particle group 34C moves to the rear substrate 22. Accordingly, the yellow particle group 34Y and the magenta particle group 34M remain on the display substrate 20, thus a red color due to the subtractive color mixture of cyan and magenta is displayed (see FIG. 3 (I)).

On the other hand, in the initial state as shown in FIG. 3 (A), if a "+ medium electric field" is formed between the display substrate 20 and the rear substrate 22, of all the particle groups (the magenta particle group 34M, the cyan particle group 34C, and the yellow particle group 34Y), the magenta particle group 34M and the cyan particle group 34C move to the display substrate 20. Accordingly, the magenta particle group 34M and the cyan particle group 34C attach to the display substrate 20, thus a blue color due to the subtractive color mixture of magenta and cyan is displayed (see FIG. 3 (E)).

In the state as shown in FIG. 3 (E), if a "− small electric field" is formed between the display substrate 20 and the rear substrate 22, within the magenta particle group 34M and the cyan particle group 34C which attach to the display substrate 20, the cyan particle group 34C move from the display substrate 20 to the rear substrate 22. Accordingly, only the magenta particle groups 34M remains on the display substrate 20, thus a magenta color is displayed (see FIG. 3 (F)).

In the state as shown in FIG. 3 (F), if a "− large electric field" is formed between the display substrate 20 and the rear substrate 22, the magenta particle group 34M moves from the display substrate 20 to the rear substrate 22. Accordingly, no particle remain on the display substrate 20, thus a white color of the insulating particles 36 is displayed (see FIG. 3 (G)).

In the initial state as shown in the FIG. 3 (A), if a "+ small electric field" is formed between the display substrate 20 and the rear substrate 22, the cyan particle group 34C (the magenta particle group 34M, the cyan particle group 34C, and the yellow particle group 34Y) move to the display substrate 20. Accordingly, the cyan particle group 34C attaches to the display substrate 20, thus a cyan color is displayed (see FIG. 3 (H)).

Furthermore, in the state as shown in the FIG. 3 (I), if a − large electric field is formed between the display substrate 20 and the rear substrate 22, all the particle groups 34 move to the rear substrate 22 as shown in FIG. 3 (G), thus a white color is displayed.

In the same manner, in the state as shown in the FIG. 3 (D), if a strong electric field is formed between the display substrate 20 and the rear substrate 22, all the particle groups 34 move to the rear substrate 22 as shown in FIG. 3 (G), thus a white color is displayed.

As described above, in the image display medium 12 of the invention, plural kinds of particle groups 34, which have different forces for separation from the display substrate 20 and the rear substrate 22, or initiate moving at different electric field intensities, are enclosed in the dispersion medium 50 between the display substrate 20 and the rear substrate 22, and an electric field according to each particle group of the particles groups 34 to selectively move desired particles. Therefore, the particles other than the desired color particles are prevented from moving in the dispersion medium 50, and the mixing of undesirable colors is reduced, which can inhibit the deterioration of the image quality of the image display medium 12.

Moreover, as shown in FIG. 3, by dispersing the particle groups 34 composed of cyan, magenta, and yellow in the dispersion medium 50, cyan, magenta, yellow, blue, red, green, and black colors can be displayed, and a white color can be displayed by the insulating particles 36. Thus desired colors can be displayed.

The image display device according to the present exemplary embodiment is further described below.

As shown in FIG. 1, the image display device 10 according to the present exemplary embodiment is composed of the image display medium 12 and a writing device 17.

The image display device 10 corresponds to the image display device of the invention, the image display medium 12 corresponds to the image display medium of the invention, and the writing device 17 corresponds to the writing device of the invention and the electric field generation unit of the image display device of the invention.

According to the present exemplary embodiment, the image display medium 12 is supposed to be fixed to the image display device 10. Alternatively, the image display medium 12 may be removably provided on the image display device 10. In this case, the image display medium 12 is regarded as being mounted on the image display device 10 when it is connected to the writing device 17 in such a manner as to receive signals, and is regarded as being detached from the image display device 10 when it is electrically unconnected with the writing device 17. In such a structure, the image display medium 12 is readily replaceable independent of the image display device 10 and the writing device 17.

The writing device 17 is composed of a voltage application unit 16, a control unit 18, a memory unit 14, and an acquisition unit 15. The voltage application unit 16, memory unit 14, and acquisition unit 15 are connected to the control unit 18 in such a manner as to receive signals.

The voltage application unit 16 corresponds to the voltage application unit of the writing device of the invention, the control unit 18 corresponds to the control unit of the writing device of the invention, and the acquisition unit 15 corresponds to the acquisition unit of the writing device of the invention.

The control unit 18 is constructed as a microcomputer comprising a CPU (central processing unit) for controlling operations of the whole device, a RAM (random access memory) for temporally storing various data, and a ROM (read only memory) storing a control program for controlling the whole device, and various programs including the later-described displaying method specified by the processing routine shown in FIGS. 6A and 6B. The displaying method may be previously stored in the ROM, or in the memory unit 14.

The voltage applying unit 16 is electrically connected to the surface electrode 40 and the rear electrode 46. In the present exemplary embodiment, both the surface electrode 40 and the rear electrode 46 are electrically connected to the voltage applying unit 16. One of the surface electrode 40 and the rear electrode 46 may be grounded, and the other may be connected to the voltage applying unit 16.

The voltage application unit 16 is a voltage application device for applying a voltage to the surface electrode 40 and the rear electrode 46, which applies a voltage to the space between the surface electrode 40 and the rear electrode 46 according to the control by the control unit 18.

The acquisition unit 15 obtains display image information containing display color information about the image color to be displayed (hereinafter may be referred to as display color) on the image display medium 12 from the outside the writing device 17.

The above-described image color and display color correspond to hue.

Examples of the acquisition unit 15 include a connection port for connecting to a wired communication network or wireless communication network. The acquisition unit 15 may be an operation panel which receives operating instructions from the operator. In this case, the acquisition unit 15 obtains the display image information when the operator gives operating instructions concerning the display image information to the acquisition unit 15 as an operation panel.

The memory unit 14 previously stores various tables such as the correspondence table 14A and the correspondence table 14B, initial voltage information, voltage application time information, various data, and also stores various data.

The initial voltage information contains voltage level information concerning the voltage to be applied to the space between the display substrate 20 and the rear substrate 22 to display a black or white color as the initial operation before displaying an image on the image display medium 12, polarity information indicating the polarity of the voltage, and voltage application time information indicating the voltage application time.

The voltage application time information indicates the period of voltage application to the space between the substrates of the image display medium 12 to provide a chromatic display. According to the present exemplary embodiment, the voltage application time is supposed to be fixed, but may be variable.

According to the present exemplary embodiment, in order to move all of the color particles of the particle groups 34 to the rear substrate 22, the voltage in the initial voltage information is fixed at a level equal to or higher the voltage level necessary to form an electric field intensity required by the above-described particle group which requires the highest electric field intensity among the color particles of the particle groups 34.

The polarity information is positive electrode information indicating a positive electrode, or negative electrode information indicating a negative electrode. According to the present exemplary embodiment, when the polarity information is positive electrode information, it indicates that the surface electrode 40 is the positive electrode and the rear electrode 46 is the negative electrode. On the other hand, when the polarity information is negative electrode information, it indicates that the surface electrode 40 is the negative electrode and the rear electrode 46 is the positive electrode. The setting may be opposite.

Figure 4:
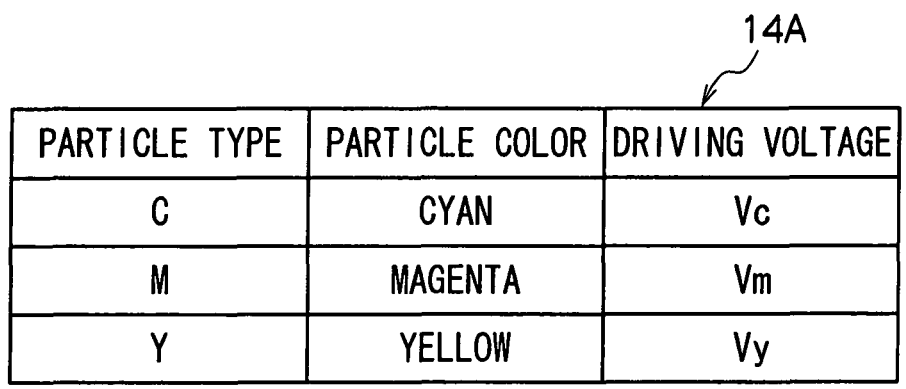
FIG. 4 is a table showing an example of information stored in the correspondence table 14A according to the present exemplary embodiment.

The correspondence table 14A is, as shown in FIG. 4, a region storing the particle type information for discriminating the color particles of the particle groups 34, the particle color information indicating the particle colors of the particle groups 34, and the driving voltage information, with correlating them each other.

The above-described driving voltage information indicates the information about the voltage to be applied to the space between the substrates to generate therein a potential difference within the range of the potential difference required for moving the color particles of the particle groups 34, wherein predetermined different values for the color particles of the particle groups 34 are memorized in correlation with the particle type information indicating the corresponding color particles of the particle groups 34.

According to the present exemplary embodiment, Vc is supposed to be previously memorized as the driving voltage for the cyan particle group 34C, wherein the Vc is |Vtc| or higher which is the absolute value of the potential difference between the substrates at the point where the cyan particle group 34C initiates moving as illustrated in FIG. 2, and |Vdc| or lower which is the absolute value of the potential difference between the substrates at the point where the display density of the cyan particle group 34C is saturated.

Further, Vm is supposed to be previously memorized as the driving voltage for the magenta particle group 34M, wherein the Vm is |Vtm| or higher which is the absolute value of the potential difference between the substrates at the point where the magenta particle group 34M initiates moving as illustrated in FIG. 2, and |Vdm| or lower which is the absolute value of the potential difference between the substrates at the point where the display density of the magenta particle group 34M is saturated.

Further, Vy is supposed to be previously memorized as the driving voltage for the yellow particle group 34Y, wherein the Vy is |Vty| or higher which is the absolute value of the potential difference between the substrates at the point where the yellow particle group 34Y initiates moving as illustrated in FIG. 2, and |Vdy| or lower which is the absolute value of the potential difference between the substrates at the point where the display density of the yellow particle group 34Y is saturated.

More specifically, the driving voltages for the color particles of the particle groups 34 are, as illustrated in FIG. 2, previously adjusted to the order of, from lowest to highest, the driving voltage Vc, driving voltage Vm, and driving voltage Vy.

The correspondence table 14B is, as shown in FIG. 5, a region storing the display color information indicating an image color to be displayed on the image display medium 12, the sequence information, the particle color information, and the polarity information with correlating them each other.

As described above with reference to FIG. 3, when a black, blue, or cyan color is displayed on the image display medium 12 in the state where a white color is displayed as shown in FIG. 3(A), the display color can be changed by applying a voltage once. On the other hand, in the state where a white color is displayed as shown in FIG. 3(A), for example, in order to display a green color as shown in FIG. 3(D), a black color (see FIG. 3(B)) and a yellow color (see FIG. 3(C)) other than the green color to be displayed are displayed, and then the green color shown in FIG. 3(D) is displayed.

Accordingly, the particle color information contains information indicating the color particle group of the particle groups 34 required to be moved to display the intended color, and the information indicating the color particle group of the particle groups 34 required to be moved to display the color to be displayed before the intended color.

The sequence information indicates the display sequence corresponding to the color indicated by the particle color information.

The polarity information is positive electrode information indicating a positive electrode, or negative electrode information indicating a negative electrode. According to the present exemplary embodiment, when the polarity information is positive electrode information, it indicates that the surface electrode 40 is the positive electrode and the rear electrode 46 is the negative electrode. On the other hand, when the polarity information is negative electrode information, it indicates that the surface electrode 40 is the negative electrode and the rear electrode 46 is the positive electrode. The setting may be opposite.

The definition of the particle color information has been given in connection with the correspondence table 14A, so that the explanation thereof is omitted herein.

In the example shown in FIG. 5, the correspondence table 14B is composed of four sections, "display color", "sequence", "particle color", and "polarity".

According to the present exemplary embodiment, the section "display color" stores the information about the following seven colors which are producible through the combination of the color particle groups: "black", "blue", "cyan", "magenta", "yellow", "red", and "green".

The "sequence" section stores the information about the order, wherein "1" represents the earliest order, "2" represents the order next to "1", and "3" represents the order next to "2".

The "particle color" section stores the information indicating the color of the particle group required for producing a corresponding display color. According to the present exemplary embodiment, any one or plural of "Y" representing a yellow color, "M" representing a magenta color, and "C" representing a cyan color are stored in correlation with the sequence information.

The "polarity" section stores the information indicating "positive electrode" or "negative electrode".

The operation of the writing device 17 is described below with reference to FIGS. 6A and 6B.

FIGS. 6A and 6B are flowcharts representing the flows of the displaying method executed by the control unit 18 to display an image in specified colors on the display medium 12. The displaying method is, as described above, previously stored in the specified region in the ROM (not shown) in the control unit 18, and executed by being read from the CPU (not shown) in the control unit 18. Here, symbol Ⓐ in FIG. 6A connects to that in FIG. 6B, and symbol Ⓑ in FIG. 6 A connects to that in FIG. 6B, respectively.

In the step 100, a determination is made as to whether the display image information has been obtained from the acquisition unit 15 or not. If NO, the routine is terminated, and if YES, the flow proceeds to the step 102, and the obtained display image information is stored in the memory unit 14.

In the subsequent step 104, as the initial operation, the initial voltage information is read from the memory unit 14. The initial voltage information contains the voltage information, voltage application time information, and polarity information.

In the subsequent step 106, an initial operation signal is outputted to the voltage application unit 16, wherein the signal indicates to apply a voltage according to the voltage level information contained in the obtained initial voltage information for a period of the voltage application time indicated by the voltage application time information, and according to the polarity indicated by the polarity information, or the surface electrode 40 is the negative electrode and the rear electrode 46 is the positive electrode.

The voltage application unit 16 receives the initial operation signal, and then applies the voltage to the space between the surface electrode 40 and the rear electrode 46 over a period of the voltage application time according to the voltage level information contained in the initial operation signal, with the surface electrode 40 as the negative electrode and the rear electrode 46 as the positive electrode.

In the step 106, a voltage is applied to the space between the substrates, then all of the negatively charged three color particles of the particle group 34 move toward and arrive the rear substrate 22.

At that time, the color of the image display medium 12 visually recognized from the display substrate 20 side is recognized as white as the color of the insulating particles 36 in the dispersion medium 50.

In the subsequent step 108, the maximum value in the sequence information corresponding to the display color information contained in the display image information obtained in the step 100 is read from the correspondence table 14B.

In the step 108, for example, when the display image information obtained in the step 100 contains display color information indicating a red color, "2", selected from "1" and "2", is read from the table, which is the maximum value in the information under the "sequence" section corresponding to the "red" information under the "display color" section. For example, when the display image information obtained in the step 100 contains display color information indicating a cyan color, "1" is read from the table, which is the maximum value in the information under the "sequence" section corresponding to the "cyan" information under the "display color" section.

In the subsequent step 110, a determination is made as to whether the maximum value in the sequence information obtained in the step 108 is "1" or not. By the processing in the step 110, a determination is made as to whether the number of the sequence information corresponding to the display color information contained in the display image information obtained in the step 100 is one or plural.

If the determination in the step 110 is YES, the flow proceeds to the step 112, and if NO, proceeds to the step 120.

In the step 120, the counter value is initialized by setting the counter value N of the counter 14C, which is previously provided in the memory unit 14, at "1".

In the subsequent step 122, all of the particle color information and the polarity information corresponding to the sequence information corresponding to the display color information contained in the display image information obtained in the step 100 is read. In the subsequent step 124, the driving voltage information corresponding to the obtained particle color information is read from the correspondence table 14A.

In the subsequent step 126, the maximum value is read from the driving voltage information obtained in the step 124.

In the subsequent step 128, a voltage application signal is outputted to the voltage application unit 16, wherein the signal indicates to apply the maximum driving voltage obtained in the step 126 according to the polarity information obtained in the step 122 for a period of the specified application time according to the voltage application time indicated by the voltage application time information previously stored in the memory unit 14.

In the subsequent step 132, a determination is made whether the counter value of the counter 14C agrees with the maximum value information obtained in the step 108, and if NO, the flow goes back to the step 122, and if YES, the flow proceeds to the step 112.

For example, in the step 132, if it is determined that the counter value N is 1, and the display image information obtained in the step 100 contains the display color information indicating a red color, in the step 122, "Y, M, C" are read as the particle color information corresponding to the sequence information "1" selected from "1" and "2" under the "sequence" section corresponding to the "red" information under the "display color" section.

Then, in the subsequent step 124, the driving voltage Vy is read from the correspondence table 14A, which is the maximum value among the driving voltages corresponding to the particle color information "Y", "M", and "C". In the subsequent step 128, a voltage application signal is outputted to voltage application unit 16, wherein the signal indicates to apply a voltage according to the obtained driving voltage Vy in a positive polarity for a specified period.

Therefore, in the image display medium 12, all of the color particles of the particle group 34 moves to the display substrate 20, so that the white color display state as shown in FIG. 3(A) is converted into the black color display state as shown in FIG. 3(B).

On the other hand, if the determination in the step 110 is YES, or the determination in the step 132 is YES, the flow proceeds to the step 112, wherein the information about one or plural particle colors and the polarity information corresponding to the maximum sequence information obtained in the step 108 are read from the correspondence table 14B.

In the subsequent step 114, the driving voltage information corresponding to the information about one or plural particle colors obtained in the step 112 is read from the correspondence table 14A.

In the subsequent step 115, the maximum driving voltage information is read from the driving voltage information obtained in the step 114.

In the processing in the steps 112 to 116, for example, when the display color information indicating a red color is contained in the display image information obtained in the step 100, the particle color information "cyan" corresponding to the maximum value "2" in the sequence information obtained in the step 108 is read, and then the driving voltage corresponding to the obtained particle color information "cyan" is read from the correspondence table 14A.

In the subsequent step 118, a voltage application signal is outputted to the voltage application unit 16, wherein the signal indicates to apply a driving voltage according to the driving voltage information obtained in the step 116 in a polarity according to the polarity information obtained in the step 112 for a period of the above-described specified voltage application time. The voltage application signal may be a pulse signal having a pulse width and a potential adjusted such that it indicates the voltage application time, the voltage, and the polarity.

The voltage application unit 16 receives the voltage application signal, and then applies a driving voltage according to the driving voltage information contained in the voltage application signal over a period of the application time according to the application time information, with the surface electrode 40 as the negative or positive electrode and the rear electrode 46 as the positive or negative electrode based on the polarity information contained in the voltage application signal, and then terminates the routine.

Through the application of the voltage, the display color contained in the display image information obtained in the step 100 is displayed on the image display medium 12.

Thus, according to the present exemplary embodiment, a voltage corresponding to the potential difference for forming an electric field intensity required for initiating movement of the color particles composing the particle groups 34 is applied to the space between the substrates, which moves the desired color particles of the particle groups 34 to display the desired color on the image display medium 12.

EXAMPLES

Examples of the invention are described below in detail. Unless otherwise specified, "part" represents "part by weight".

Example 1

Preparation of Particles

The particle groups 34 is composed of three kinds of particle groups, or cyan, magenta, and yellow particles which require different electric field intensities to initiate moving from either the display substrate 20 or the rear substrate 22 to the other substrate.

Example 1 describes an image display medium 12 in which a yellow particle group 34Y, a magenta particle group 34M, and a cyan particle group 34C having a different average charge from each other are enclosed and magnetic forces acting on a yellow particle group 34Y, a magenta particle group 34M, and a cyan particle group 34C are nearly equal.

—Preparation of Magenta Particle Group 34M—

The magenta particles of the magenta particle group 34M of magenta color are prepared by the following procedure.

53 parts by weight of cyclohexyl methacrylate, 3 parts by weight of a magenta pigment (trade name: Carmine 6B, manufactured by Dainichiseika Color & Chemicals Manufacturing Co., Ltd.), 1.5 parts by weight of a charge controlling agent (trade name: COPY CHARGE PSY VP2038, manufactured by Clariant in Japan), and 13.3 parts by weight of magenta color-coated magnetite are ground in a ball mill for 20 hours together with zirconia balls having a diameter of 10 mm to obtain a dispersion liquid A. 40 parts by weight of calcium carbonate and 60 parts by weight of water are finely ground in a ball mill to obtain a calcium carbonate dispersion liquid B. 4.3 g of 2% Cellogen (trade name) aqueous solution, 8.5 g of the calcium carbonate dispersion liquid B, and 50 g of 20% salt water are mixed, the mixture is deaerated in an ultrasonic device for 10 minutes, and stirred in an emulsifier to obtain a mixed solution C. Thorough mixing of 35 g of the dispersion liquid A and 1 g of divinylbenzene, and 0.35 g of a polymerization initiator AIBN is carried out, and the mixture is deaerated in an ultrasonic device for 10 minutes. The mixture is added to the mixed solution C, and emulsified with an emulsifier.

Subsequently, the emulsified liquid is put in a bottle, closed with a silicon cap, and pressure is reduced by thoroughly removing air using an injection needle. The bottle is filled with nitrogen gas, followed by reacting at 60° C. for 10 hours to obtain particles. The obtained particle powder is dispersed in ion-exchanged water, calcium carbonate is decomposed with hydrochloric acid water, and the mixture is filtered. Subsequently, the particles are thoroughly washed with distilled water, sorted by particle size, and dried. 2 parts by weight of the obtained particles are put in 98 parts by weight silicone oil (octamethyl trisiloxane) together with 2 parts by weight of a nonionic surfactant polyoxyethylene alkylether, stirred, and dispersed to obtain a mixed solution.

The polarity of the magenta particle group 34M contained in the mixed solution obtained above is measured using a parallel electrode plate, and is found to be negative.

In the present exemplary embodiment, as described above, the particles of the magenta particle group 34M by containing magenta color-coated magnetite as a magnetic material a magnetic force can be imparted to the particles. The thus obtained magenta particles (magenta particle group 34M) have a volume average primary particle size of 1 μm.

—Preparation of Cyan Particle Group 34C—

The cyan particles of the cyan particle group 34C are prepared by the following procedure. The cyan particles are prepared in the same manner as the magenta particle group 34M, except that the magenta pigment is replaced with a cyan pigment (trade name: Cyanine Blue 4933M, manufactured by Dainichiseika Color & Chemicals Mfg. Co., Ltd.), the magenta color-coated magnetite with cyan color-coated magnetite, and the amount of the charge controlling agent (trade name: COPY CHARGE PSY VP2038, manufactured by Clariant Japan) is changed to 2 parts by weight.

In the present exemplary embodiment, as described above, the particles of the cyan particle group 34C can be magnetized by containing cyan color-coated magnetite as a magnetic material.

The thus obtained cyan particles (cyan particle group 34C) have a volume average primary particle diameter of 1 μm. The polarity of the cyan particle group 34C is measured in the same manner as the magenta particle group 34M, and is found to be negative.

above-described maximum potential difference for the color particles of the particle groups 34 (the potential difference between the substrates at the point where the display density does not change and get saturated even though the voltage applied to the space between the substrates and the voltage application time are further increased from the point of initiation of moving).

These measurement results and setting results are shown in Table 1.

TABLE 1

| | Particle color | Magnetite content (parts by weight) | Charge controlling agent (parts by weight) | Electrostatic force Average charge (×10⁻¹⁷ C/particle) | Binding force Volume average primary particle diameter (μm) | Quantity of magnetism (emu/g) | Shape factor | Polarity | Moving voltage (V) | Driving voltage (V) |
|---|---|---|---|---|---|---|---|---|---|---|
| Particle group 34C | Cyan | 13.3 | 2 | −14 | 1 | 12 | 107 | Negative | 46 | 55 |
| Particle group 34M | Magenta | 13.3 | 1.5 | −10.5 | 1 | 12 | 106 | Negative | 62 | 73 |
| Particle group 34Y | Yellow | 13.3 | 1 | −7 | 1 | 12 | 107 | Negative | 93 | 110 |

—Preparation of Yellow Particle Group 34Y—

The yellow particles of the yellow particle group 34Y are prepared by the following procedure. The yellow particles are prepared in the same manner as the magenta particle group 34M except that the magenta pigment is replaced with a yellow pigment (trade name: Pigment Yellow 17, manufactured by Dainichiseika Color & Chemicals Mfg. Co., Ltd.), the magenta color-coated magnetite with yellow color-coated magnetite, and the amount of the charge controlling agent (trade name: COPY CHARGE PSY VP2038, manufactured by Clariant Japan) is changed to 1 part by weight.

In the present exemplary embodiment, as described above, the particles of the yellow particle group 34Y can be magnetized by containing yellow color-coated magnetite as a magnetic material. The thus obtained yellow particles (yellow particle group 34Y) have a volume average primary particle diameter of 1 μm. The polarity of the yellow particle group 34Y is measured in the same manner as the magenta particle group 34M, and is found to be negative.

Each of the thus obtained magenta particle group 34M of a magenta color, cyan particle group 34C of a cyan color, and yellow particle group 34Y of a yellow color is measured for the average charge contributing to the "electrostatic force", volume average primary particle diameter contributing to the "binding force", quantity of magnetism of particles contributing to the magnetic force acting on the particles, and shape factor SF1. In addition, using the image display medium prepared by the later-described method, the relationship between the applied voltage and the display density is measured, and the absolute value of the potential difference between the substrates for forming an electric field intensity required to initiate movement of the particles composing the magenta particle group 34M, cyan particle group 34C, and yellow particle group 34Y (hereinafter may be referred to as moving voltage) is determined, and at the same time, a driving voltage is established.

The driving voltage is, as described above, the potential difference higher than the potential difference between the substrates for forming an electric field intensity required to initiate movement of the particles, and represents the absolute value of the potential difference equal to or lower than the The average charge, volume average primary particle diameter, quantity of magnetism, and shape factor SF1 are measured by the following measuring methods.

<Method of Measuring the Volume Average Primary Particle Size>

The volume average primary particle size is, when the particles to be measured have a diameter of 2 μm or more, measured with a Coulter Counter TA-II (manufactured by Beckman Coulter), and an electrolyte (trade name: ISOTON-II, manufactured by Beckman Coulter).

The measuring method is as follows. 0.5 to 50 mg of the sample for measurement is added to 2 ml of a surfactant as a dispersant, preferably 5% aqueous solution of sodium alkylbenzene sulfonate, and the mixture is added to 100 to 150 ml of the electrolyte. The suspension of the sample in the electrolyte is dispersed in an ultrasonic disperser for about 1 minutes, and the particle size distribution of the particles having a particle size of 2.0 to 60 μm is measured with the Coulter Counter TA-II using an aperture having an aperture diameter of 100 μm. The number of the particles for measurement is 50,000.

With the thus measured particle size distribution, for the divided particle size range (channel), a cumulative distribution is drawn for each of volume and number from the side of small diameter, and the particle size at the point where the accumulation by volume reaches 16% is defined as the volume average particle size D16v, and the cumulative number particle size at the point where the accumulation by number reaches 16% is defined as D16p. In the same manner, the particle size at the point where the accumulation by volume reaches 50% is defined as the volume average particle size D50v, and the particle size at the point where the accumulation reaches 50% is defined as the number average particle size D50p. Furthermore, in the same manner, the particle size at the point where the accumulation by volume reaches 84% is defined as the volume average particle size D84v, and the cumulative number particle size at the point where the accumulation by number reaches 84% is defined as D84p. The volume average primary particle size is D50v.

Using these values, the volume average particle size distribution index (GSDv) is calculated by $(D84v/D16v)^{1/2}$, the number average particle size index (GSDp) is calculated by $(D84p/D16p)^{1/2}$, and the small diameter particle number average particle size (lower GSDp) is calculated by $\{(D50p)/(D16p)\}$.

On the other hand, when the diameter of the particles to be measured is less than 2 μm, the particles are measured with a laser diffraction particle size distribution meter (trade name: LA-700, manufactured by Horiba, Ltd.). The measuring method is as follows. The sample in a dispersion liquid state is adjusted to have a solids content of about 2 g, to the solution ion-exchanged water is added to make about 40 Ml. The mixture is put in a cell to an adequate concentration, and after a lapse of about two minutes, measurement is carried out when the concentration in the cell is almost stabilized. The thus obtained volume average primary particle size of each channel is accumulated from the smaller volume average primary particle size, and the point at which the accumulation reaches 50% is determined as the volume average primary particle size.

When fine particles such as an external additive is measured, 2 g of the sample for measurement is added to 50 ml of a surfactant, preferably 5% aqueous solution of sodium alkylbenzene sulfonate, and the mixture is dispersed in an ultrasonic disperser (1,000 Hz) for two minutes to obtain the sample. The sample is measured in the same manner as the above-described dispersion liquid.

<Method of Determination of the Average Charge>

The average charge can be determined, for example, by measuring the electrophoresis electric current of a specified weight of particles. A dispersion liquid in which a specified weight of particles is dispersed is filled in a parallel plate electrode cell, a voltage is applied between the parallel plate electrodes, and the electric current when all the filled particles move between the electrodes is measured to calculate the electric charge. The electric charge per particle is calculated from the electric charge and the particle weight. The calculation is carried out on the assumption that the particles are truly spherical and have a uniform diameter.

<Method of Measurement of Quantity of Magnetism>

The quantity of magnetism is measured using a vibrated sample magnetometer (manufactured by Toei Industry Co., Ltd.) under an external magnetic field of 1 kOe.

<Method of Determination of Shape Factor SF1>

The shape factor SF1 is determined as follows: a microscopic image of the particles observed by a scanning electron microscope (SEM) is imported into a Luzex image analyzer (manufactured by Nireco Co., Ltd.), and at least 50 particles are measured for the maximum length and projected area, which are assigned to the following formula (1), and the average is calculated to obtain SF1.

$$SF1=(ML^2/A)\times(\pi/4)\times100 \qquad \text{Formula (1)}$$

In the formula (1), ML represents the absolute maximum length of a particle, and A represents the projected area of the particle.

<Method of Measurement of Moving Voltage>

The moving voltage is measured as follows: a single kind of the particle group prepared as described above is enclosed in the dispersion medium of the image display medium prepared by the later-described method, a voltage is applied to the space between the electrodes, and the density on the display substrate is measured using a densitometer (trade name: X-Rite964, manufactured by X-Rite). The voltage (or potential difference) corresponding to the threshold at which the density difference between before and after the density measurement is 0.01 or more (with reference to 10 V) is measured as the moving voltage.

In addition, the voltage at the point where the measured density value is saturated is measured, and the voltage higher than the moving voltage and equal to or lower than the voltage at the point where the measured density is saturated is set as the driving voltage.

—Preparation of the Insulating Particles 36—

As the insulating particles 36, the particles prepared as follows are used.

53 parts by weight of cyclohexyl methacrylate, 45 parts by weight of titanium oxide (trade name: Tipaque CR63, manufactured by Ishihara Sangyo Kaisha, Ltd.), and 5 parts by weight of cyclohexane are ground for 20 hours in a ball mill together with zirconia balls having a diameter of 10 mm to obtain a dispersion liquid A. 40 parts by weight of calcium carbonate and 60 parts by weight of water are finely ground in a ball mill to obtain a calcium carbonate dispersion liquid B. 4.3 g of 2% Cellogen aqueous solution, 8.5 g of calcium carbonate dispersion liquid, and 50 g of 20% salt water are mixed, the mixture is deaerated in an ultrasonic device for 10 minutes, and stirred in an emulsifier to obtain a mixed solution C. 35 g of the dispersion liquid A and 1 g of divinylbenzene, and 0.35 g of a polymerization initiator AIBN are thoroughly mixed, and the mixture is deaerated in an ultrasonic device for 10 minutes. The mixture is added to the mixed solution C, and emulsified with an emulsifier.

Subsequently, the emulsified liquid is put in a bottle, closed with a silicon cap, and thoroughly deaerated under reduced pressure using an injection needle. The bottle is filled with a nitrogen gas, followed by reacting at 60° C. for 10 hours to obtain particles. After cooling, the dispersion liquid is subjected to freeze drying at −35° C., 0.1 Pa for two days to remove cyclohexane. The thus obtained fine particles are dispersed in ion-exchanged water, calcium carbonate is decomposed with hydrochloric acid water, and the mixture is filtered. Subsequently, the particles are thoroughly washed with distilled water, uniformed in the particle size, and dried. The insulating particles 36 have a white color, and a volume average primary particle size of 20 μm. The volume average primary particle size is measured by the above-described procedure.

—Preparation of Image Display Medium and Image Display Device—

In the present example, the image display medium 12 uses a transparent conductive ITO supporting substrate of 70 mm×50 mm×1.1 mm as the supporting substrate 38, and plural linear surface electrodes 40 having a width of 0.234 mm are formed on the supporting substrate 38 by etching with spacings of 0.02 mm. In the same manner, an ITO supporting substrate of 70 mm×50 mm×1.1 mm is used as the supporting substrate 44, and plural linear rear electrodes 46 having a width of 0.234 mm are formed on the supporting substrate 44 by etching with spacings of 0.02 mm.

A polycarbonate resin is applied onto each of the surface electrode 40 and the rear electrode 46 in a thickness of about 0.5 μm to form a surface layer 42 and a surface layer 48, respectively.

The average surface roughness of the surface layer 42 and the surface layer 48 is measured using a laser displacement microscope (trade name: OLS1100, manufactured by Olympus Corporation), and is found to be Ra 0.2 μm.

As described above, the display substrate 20 and the rear substrate 22 are respectively prepared.

Subsequently, a gap member 24 is formed on the rear substrate 22 with a height 100 μm. The gap member 24 is formed such that a cell (a region surrounded by the gap member 24, the display substrate 20, and the rear substrate 22) is provided for the pixels of the image displayed on the image display medium 12.

The gap member 24 is formed in the desired pattern form on the rear substrate 22 by photolithography using a photoresist film. The cell pattern formed by the gap member 24 is a square cell of 0.254 mm by 0.254 mm generally corresponding to a pixel. The gap member 24 may be also be formed by applying a heat-curing epoxy resin in a desired pattern form to the rear substrate 22 by screen printing, and heat-curing the resin. The process may be repeated until a necessary thickness is achieved. Alternatively, the gap member 24 may be formed by attaching to the rear substrate 22 a thermoplastic film, which has been formed in a desired surface form by injection compression molding, embossing, or hot pressing. The gap member 24 can be integrally formed with the rear substrate 22 by embossing or hot pressing. Of course, the gap member 24 may be formed on the display substrate 20, or integrally formed with the display substrate 20, as long as the transparency is not impaired.

The dispersion medium 50 is silicone oil manufactured by Shin-Etsu Chemical Co., Ltd.

The yellow particle group 34Y, the magenta particle group 34M, and the cyan particle group 34C prepared as above are dispersed in silicone oil having a viscosity of 1 cs (manufactured by Shin-Etsu Chemical Co., Ltd.) in the proportion of 1:1:1 in terms of the volume ratio. At the same time, a dispersion liquid containing 10 parts by weight of the insulating particles 36 is filled on the rear substrate 22 having formed thereon the gap member 24, so that a dispersion liquid of the mixed particles is filled in the cells (regions divided by the gap member 24).

The insulating particles 36 are mixed with the dispersion medium 50 in the proportion of 1 to 10, such that the particles are disposed along the opposing direction of the display substrate 20 and the rear substrate 22 with a gap which the particles of the particle groups 34 can pass through, and provided in the cell in such a manner that the distances between the insulating particles 36 and the display substrate 20, and between the insulating particles 36 and the rear substrate 22 are nearly equal.

The image display medium 12 of the invention can be prepared as follows. On the rear substrate 22, on which the gap member 24 has been provided, the mixture of the plurality of kinds of particle groups 34, the insulating particle 36, and the dispersion medium is put in each cell as described above, then the display substrate 20 is disposed, and the rear substrate 22 and the display substrate 20 are fixed with a clamp or the like.

The total volume ratio of the particle groups 34 to the void volume between the substrates (corresponding to the cell volume) is about 3%. The total volume ratio of the insulating particles 36 to the void volume between the substrates is about 10%.

Electric field intensities of $5 \times 10^5$ V/m, $7.5 \times 10^5$ V/m, and $10 \times 10^5$ V/m are formed between the display substrate 20 and the rear substrate 22 of the image display medium 12, in which magnetized particle groups having different average charges, or the yellow particle group 34Y (electric charge: $-7.0 \times 10^{-17}$ C/particle), magenta particle group 34M (electric charge: $-10.5 \times 10^{-17}$ C/particle), and cyan particle group 34C (electric charge: $-14.0 \times 10^{-17}$ C/particle) have been enclosed, and the electric fields induce an electrostatic force (N) acting on the particles (electrostatic force by the electric field E, $F = q \cdot E$). The electrostatic forces are listed in Table 2.

TABLE 2

| Particle group | Electric field intensity | | |
|---|---|---|---|
| | $4.5 \times 10^5$ (V/m) | $6 \times 10^5$ (V/m) | $9 \times 10^5$ (V/m) |
| Yellow particle group | $3.2 \times 10^{-11}$ (N) | $4.2 \times 10^{-11}$ (N) | $6.3 \times 10^{-11}$ (N) |
| Magenta particle group | $4.7 \times 10^{-11}$ (N) | $6.3 \times 10^{-11}$ (N) | $9.5 \times 10^{-11}$ (N) |
| Cyan particle group | $6.3 \times 10^{-11}$ (N) | $8.4 \times 10^{-11}$ (N) | $12.6 \times 10^{-11}$ (N) |

The force for separation of the particle groups follows, as described above, a relationship expressed by: force for separation=electrostatic force−binding force. For example, in cases where a binding force of $6.3 \times 10^{-11}$ N is acting on the color particle groups (yellow particle group 34Y, magenta particle group 34M, and cyan particle group 34C) as shown in Table 2 and FIG. 7 prepared on the basis of Table 2, when an electrostatic force higher than the binding force, more specifically an electrostatic force of $6.3 \times 10^{-11}$ N or more acts on the color particles, the color particle groups separate from the substrate and move to the opposing substrate.

For example, in cases where a binding force of $6.3 \times 10^{-11}$ N acts on the particle groups, the particle group respondent to the electrostatic force in the hatched area in Table 2 (gray area) moves from one substrate to the other substrate, and, as indicated with an arrow in FIG. 7, the particle group under an electric field, which has an electric field intensity to induce an electrostatic force exceeding the binding force acting on the particle group, also moves from one substrate to the opposite substrate.

More specifically, for the yellow particle group, when an electric field intensity of $9 \times 10^5$ V/m is formed, the electrostatic force acting on the yellow particle group exceeds the binding force, thus the particles separate from one substrate and move to the other substrate. For the magenta particle group, when an electric field intensity of $6 \times 10^5$ V/m is formed, the electrostatic force acting on the magenta particle group exceeds the binding force, thus the particles separate from one substrate and move to the other substrate. For the cyan particle group, when an electric field intensity of $4.5 \times 10^5$ V/m is formed, the electrostatic force acting on the cyan particle group exceeds the binding force, thus the particles separate from one substrate and move to the other substrate.

From the above-described fact, in the present exemplary embodiment, the magnetic forces acting on the three color particle groups (cyan particle group 34C, magenta particle group 34M, and yellow particle group 34Y) are equalized to $6.3 \times 10^{-11}$ N.

In order to equalize the magnetic forces acting on the three color particle groups at $6.3 \times 10^{-11}$ N, as shown in Table 1, a magnet having an appropriately selected magnetic force, which serves as a magnetic force acting on the magnetized particle groups (cyan particle group 34C, magenta particle group 34M, and yellow particle group 34Y) having the same quantity of magnetism, is provided on the display substrate 20 and the rear substrate 22. The display substrate may be a magnetized resin or magnetic substrate having particularly high transparency.

As described above with reference to FIGS. 3 and 6, a desired color can be displayed by selectively moving the color particles of the particle groups 34 according to the color to be displayed.

Further, as shown by the present exemplary embodiment, when the image display medium 12 in which a yellow particle group 34Y, a magenta particle group 34M, and a cyan particle group 34C are enclosed and magnetic forces acting on a yellow particle group 34Y, a magenta particle group 34M, and a cyan particle group 34C are nearly equal is produced, the force for separation of the particle groups from the substrate, or the electric field intensity to initiate movement of the color particles of the particle group 34 can be readily adjusted by equalizing the magnetic force acting on the particle groups, and individually adjusting the average charge of the particle groups. The magnetic force acts on the particles accumulated on the substrate surface even though they are not in contact with the substrate surface, which enhances the power for binding the particles to the substrate, and suppresses color mixing caused by separation of undesired particles.

In the above-described Example, in order to adjust the charge of the particle groups, the content of the charge controlling agent in the particles of the particle groups is adjusted. Alternatively, other known methods may be used, for example, an external additive such as a surfactant for use in a liquid developer is added to the dispersion liquid of the particles, or the resin composition of the particles is changed. The adjustment may be also conducted by changing the volume average primary particle diameter of the particles of the particle groups, or by varying the surface asperities to make the particle groups have different specific surface areas.

The electrode of the display substrate of the image display medium 12 prepared in Example 1 is connected to Trek 610C (trade name, manufactured by Trek) as the voltage application unit 16, and the electrode of the rear substrate is grounded. To the voltage application unit 16, a personal computer (trade name: CF-R1, Manufactured by Matsushita Electric Industrial Co., Ltd.) is connected as a machine having the functions of the control unit 18, the memory unit 14, and the acquisition unit 15. The personal computer previously stores the processing program shown in FIGS. 6A and 6B, and the storage area in the personal computer stores the correspondence table 14A shown in FIG. 4 storing the particle colors and driving voltage levels listed in Table 1 and the correspondence table 14B shown in FIG. 5.

Using the above-described image display device, the flowchart shown in FIGS. 6A and 6B is executed in the control unit 18 on the cases where the display image information containing display color information of cyan, magenta, yellow, black, blue, red, or green is obtained; the color of the display color information contained in the obtained display image information is displayed on the image display medium 12.

Example 2

In Example 1, in order to adjust the color particles of the particle group 34 such that the binding forces of the color particles to the display substrate 20 and the rear substrate 22 are equal, and the electrostatic forces acting on the color particles are different, the cases of producing the image display medium 12 in which a yellow particle group 34Y, a magenta particle group 34M, and a cyan particle group 34C are enclosed and magnetic forces acting on a yellow particle group 34Y, a magenta particle group 34M, and a cyan particle group 34C are nearly equal are described. In the present exemplary embodiment, the adjustment is conducted by varying the average charge of the particles and generally equalizing their flow resistance against the dispersion medium 50.

The magenta particles of the magenta particle group 34M are prepared by the following procedure. A mixture of 40 parts by weight of a copolymer of ethylene (89%) and methacrylic acid (11%) (trade name: Nucrel N699, manufactured by Du Pont), 8 parts by weight of a magenta pigment (trade name: Carmine 6B, manufactured by Dainichiseika Color & Chemicals Manufacturing. Co., Ltd.), and 2 parts by weight of a charge controlling agent (trade name: COPY CHARGE PSY VP2038, manufactured by Clariant in Japan) is put in a stainless steel beaker, and heated in an oil bath at 120° C. for 1 hour with stirring to obtain a uniform melt of the completely molten resin, the pigment, and the charge controlling agent. The thus obtained melt is gradually cooled to room temperature with stirring, and 100 parts of Norpar 15 (manufactured by Exxon Corporation) are added. With the decrease in the temperature of the system, mother particles containing the pigment and the charge controlling agent and having a particle size of 10 to 20 μm deposits. 100 g of the deposited mother particles is put in a 01 type attritor, and ground together with steel balls having a diameter of 0.8 mm. The grinding is continued until the particle size becomes 1 μm with monitoring the volume average particle size using a centrifugal particle size distribution analyzer (trade name: SA-CP4L, manufactured by Shimadzu Co., Ltd.). 20 parts of the obtained concentrated toner (particle concentration: 18% by weight) is diluted with 160 parts by weight of eicosane ($C_{20}H_{42}$, melting point: 36.8° C.), which has been previously molten by heating at 75° C., to achieve a particle concentration of 2% by weight with reference to the particle dispersion liquid, and thoroughly stirred.

In the present exemplary embodiment, as described above, a voltage of a frequency to vibrate the particles of the magenta particle group 34M is applied to the particles to adjust the flow resistance of the magenta particles to the dispersion medium 50 used in the present exemplary embodiment to $6 \times 10^{-11}$ N.

The thus obtained magenta particles have a volume average primary particle size of 1 μm.

The polarity is measured in the same manner as Example 1, and the charge polarity is found to be negative.

—Preparation of Cyan Particle Group 34C—

The cyan particles of the cyan particle group 34C are prepared by the following procedure. The cyan particles are prepared in the same manner as the magenta particle group 34M prepared in Example 2 except that the magenta pigment is replaced with a cyan pigment (trade name: Cyanine Blue 4933M, manufactured by Dainichiseika Color & Chemicals Mfg. Co., Ltd.). The thus obtained particles of the cyan particle group 34C have a volume average primary particle diameter of 1 μm. The polarity of the cyan particle group 34C is measured in the same manner as Example 1, and the charge polarity is found to be negative.

—Preparation of Yellow Particle Group 34Y—

The yellow particles of the yellow particle group 34Y are prepared by the following procedure. The yellow particles are prepared in the same manner as the magenta particle group 34M prepared in Example 2 except that the magenta pigment is replaced with a yellow pigment (trade name: Pigment Yellow 17, manufactured by Dainichiseika Color & Chemicals Mfg. Co., Ltd.).

In the present exemplary embodiment, as described above, a voltage having a frequency to vibrate the particles is applied to the particles of the yellow particle group 34Y, thus the flow resistance against the dispersion medium 50 is equalized with that of the magenta particle group 34M. The thus obtained yellow particles have a volume average primary particle diameter of 1 μm. The polarity is measured in the same manner as Example 1, and the charge polarity is found to be negative.

The average charge of the yellow particle group 34Y, the magenta particle group 34M, and the cyan particle groups 34M enclosed in each cell as described above is the same with that in the first exemplary embodiment.

Each of the thus obtained the particle groups 34 is measured for the average charge contributing to the "electrostatic force", and the volume average primary particle diameter, quantity of magnetism, and shape factor SF1 contributing to the "binding force" in the same manner as Example 1, and is also measured for the flow resistance at the interface between a dispersion medium (octamethyl trisiloxane). In addition, using an image display medium containing the three color particles of the particle groups 34 adjusted in Example 2 (yellow particle group 34Y, magenta particle group 34M, and cyan particle group 34C), which is prepared in the same manner as Example 1, the relationship between the applied voltage and the display density is measured, the moving voltage is determined, and the driving voltage is established. The measurement results and the established driving voltages are listed in Table 3.

In addition, an image display device is prepared in the same manner as Example 1, except that the image display medium prepared in Example 1 is replaced with the image display medium 12 prepared in Example 2.

The electrode of the display substrate is connected to Trek 610C (trade name, manufactured by Trek) as the voltage application unit 16, and the electrode of the rear substrate is grounded. To the voltage application unit 16, a personal computer (trade name: CF-R1, Manufactured by Matsushita Electric Industrial Co., Ltd.) is connected as a machine having the functions of the control unit 18, the memory unit 14, and the acquisition unit 15. The personal computer previously stores the processing program shown in FIGS. 6A and 6B, and the storage area in the personal computer stores the correspondence table 14A shown in FIG. 4 containing the particle

TABLE 3

| | | Charge controlling agent (parts by weight) | Electrostatic force Average charge (C/particle) | Volume average primary particle diameter (μm) | Binding force | | | | | |
|---|---|---|---|---|---|---|---|---|---|---|
| | Particle color | | | | Resistance at interface with dispersion medium | Quantity of magnetism (emu/g) | Shape factor | Polarity | Moving voltage (V) | Driving voltage (V) |
| Particle group 34C | Cyan | 2 | −14 | 1 | 644 | 0 | 107 | Negative | 46 | 55 |
| Particle group 34M | Magenta | 1.5 | −10.5 | 1 | 651 | 0 | 106 | Negative | 62 | 73 |
| Particle group 34Y | Yellow | 1 | −7 | 1 | 648 | 0 | 107 | Negative | 93 | 110 |

The average charge, volume average primary particle diameter, quantity of magnetism, and shape factor SF1 are measured in the same manner as Example 1. The flow resistance (corresponding to "Resistance at interface with dispersion medium" in Table 3) is measured by the following measuring method.

<Method of Measurement of Flow Resistance at the Interface with the Dispersion Medium>

The flow resistance at the interface with the dispersion medium is measured as follows: only one kind of the particle groups prepared as described above is enclosed in the dispersion medium (the dispersion medium herein refers to the mixed solution mixture composed of the later-described image display medium and the mixed solution of the three kinds of dispersion liquids containing the color particles) of the image display medium prepared by the later-described method, a voltage is applied to the space between the electrodes, and the voltage level at which the particle group initiates moving is measured. After the voltage is applied to the dispersion medium to accumulate the particle group on one substrate, another voltage is applied to move the particle group to the other substrate. The measurement is conducted with the surface of the electrode substrate coated with a material having a low surface energy, such as a fluorocarbon resin, to minimize the interaction between the substrate and the particles. The obtained voltage level is multiplied by the charge of the particle group to determine the secondary physical property value indicating the flow resistance.

An image display medium 12 is prepared in the same manner as Example 1, except that the yellow particle group 34Y, magenta particle group 34M, and cyan particle group 34C prepared in Example 1 are replaced with the yellow particle group 34Y, magenta particle group 34M, and cyan particle group 34C prepared in Example 2.

colors and driving voltage levels listed in Table 3 and the correspondence table 14B shown in FIG. 5.

Using the above-described image display device, the flowchart shown in FIGS. 6A and 6B is executed in the control unit 18 on the cases where the display image information containing display color information of cyan, magenta, yellow, black, blue, red, or green is obtained; the color of the display color information contained in the obtained display image information is displayed on the image display medium 12.

The result indicates that desired colors are displayed also in Example 2 by selectively moving the color particles of the particle groups 34.

In addition, as shown by Example 2, when the color particles of the particle groups 34 are adjusted such that they have an equal flow resistance and different average charges, the electric field intensity to initiate movement can be readily adjusted by adjusting the average charge of the particles.

When the image display medium 12 contains the yellow particle group 34Y, magenta particle group 34M, and cyan particle group 34C, which have different average charges and nearly equal flow resistances against a liquid, which serve as the particle groups initiating moving at different electric field intensities, the binding force of the particle groups 34 to the display substrate 20 and the rear substrate 22 is considered to vary depending on the flow resistance of the particles composing the particle groups 34.

On the other hand, in Example 2, a frequency to vibrate the particles is given to the particles in the dispersion medium 50, which is considered to break the network between the particles accumulated on the surface and in the vicinity of the substrate, thereby reducing the flow resistance of the particles. Because of this, the binding force due to the flow resistance decreases, in turn the moving voltage and the driving voltage decrease.

Example 3

In Example 1, in order to adjust the color particles of the particle group 34 such that they have the same binding force to the display substrate 20 and the rear substrate 22 and are subjected to different electrostatic forces, the cases of producing the image display medium 12 in which a yellow particle group 34Y, a magenta particle group 34M, and a cyan particle group 34C are enclosed and magnetic forces acting on a yellow particle group 34Y, a magenta particle group 34M, and a cyan particle group 34C are nearly equal are described. In the present exemplary embodiment, a case in which the binding force is adjusted by varying the average charge and generally equalizing the adhesion force (van der Waals force) to the display substrate 20 and the rear substrate 22 among the particle groups will be described. More specifically, in the present exemplary embodiment, the shape factor is generally equalized among the particles.

—Preparation of Magenta Particle Group 34M—

The magenta particles of the magenta particle group 34M are prepared by the following procedure.

53 parts by weight of cyclohexyl methacrylate, 3 parts by weight of a magenta pigment (trade name: Carmine 6B, manufactured by Dainichiseika Color & Chemicals Mfg. Co., Ltd.), 1.5 parts by weight of a charge controlling agent (trade name: COPY CHARGE PSY VP2038, manufactured by Clariant Japan), and 9 parts by weight of cyclohexane are pulverized in a ball mill for 20 hours together with zirconia balls having a diameter of 10 mm to obtain a dispersion liquid A.

Subsequently, 40 parts by weight of calcium carbonate and 60 parts by weight of water are pulverized in a ball mill to obtain a calcium carbonate dispersion liquid B. Thereafter, 4.3 parts by weight of a 2% Cellogen aqueous solution, 20.4 parts by weight of the calcium carbonate dispersion liquid B, and 50 parts by weight of 20% salt solution are mixed, the mixture is deaerated in an ultrasonic device for 10 minutes, and stirred in an emulsifier to obtain a mixed solution C.

35 parts by weight of the dispersion liquid A, 1 part by weight of divinylbenzene, and 0.35 parts by weight of a polymerization initiator AIBN are thoroughly mixed, and the mixture is deaerated in an ultrasonic device for 10 minutes. The mixture is added to the mixed solution C, and emulsified with an emulsifier.

Subsequently, the emulsified liquid is placed in a bottle, closed with a silicon cap, thoroughly deaerated under reduced pressure using an injection needle, and then the bottle is filled with a nitrogen gas. Subsequently, the emulsified liquid is reacted at 60° C. for 10 hours to obtain particles. After cooling, the dispersion liquid containing the particles is dried at $1.3 \times 10^4$ Pa, 30° C., for 5 hours to remove cyclohexane. The obtained particle powder is dispersed in ion-exchanged water, calcium carbonate is decomposed with hydrochloric acid water, and the mixture is filtered. Thereafter, the powder is repeatedly washed with distilled water. Thereafter, the powder is vacuum dried at 30° C. for 6 hours, and pulverized for 30 minutes using an attritor to obtain particles.

2 parts by weight of the thus obtained particles are added to 98 parts by weight of silicone oil (octamethyl trisiloxane), and dispersed and mixed under stirring to obtain a dispersion liquid of the magenta particle group 34M. The thus obtained particles have a shape factor of 120. The polarity is measured in the same manner as Example 1, and is found to be negative.

In Example 3, as described above, the particles of the magenta particle group 34M has fine surface asperities such that they have the same adhesion force to the display substrate 20 and the rear substrate 22 as the later-described cyan particle group 34C and yellow particle group 34Y.

—Preparation of Cyan Particle Group 34C—

The dispersion liquid of the cyan particle group 34C of a cyan color is obtained in the same manner as the magenta particle group 34M of a magenta color prepared in Example 3, except that the magenta pigment is replaced with a cyanine pigment (trade name: Cyanine Blue 4933M, manufactured by Dainichiseika Color & Chemicals Mfg. Co., Ltd.), and the amount of the charge controlling agent is changed to 2 parts by weight.

In the present exemplary embodiment, as described above, the particles of the cyan particle group 34C have fine surface asperities such that they have the same adhesion force to the display substrate 20 and the rear substrate 22 as the above-described magenta particle group 34M. The thus obtained cyan particles have a shape factor of 120. The polarity is measured in the same manner as Example 1, and is found to be negative.

—Preparation of Yellow Particle Group 34Y—

The mixed solution of the yellow particle group 34Y of a yellow color is obtained in the same manner as the magenta particle group 34M of a magenta color prepared in Example 3, except that the magenta pigment is replaced with a yellow pigment (trade name: Pigment Yellow 17, manufactured by Dainichiseika Color & Chemicals Mfg. Co., Ltd.), and the amount of the charge controlling agent is changed to 1 part by weight.

In the present exemplary embodiment, as described above, the particles of the yellow particle group 34Y have fine surface asperities such that they have the same adhesion force to the display substrate 20 and the rear substrate 22 as the above-described magenta particle group 34M and cyan particle group 34C. The thus obtained yellow particles have a shape factor of 120. The polarity is measured in the same manner as Example 1, and is found to be negative.

Each of the particle groups in the thus obtained mixed solutions is measured for the average charge contributing to the "electrostatic force", and the volume average primary particle diameter, quantity of magnetism, and shape factor SF1 contributing to the "binding force" in the same manner as Example 1. In addition, using an image display medium prepared in the same manner as Example 1, the relationship between the applied voltage and the display density is measured, the moving voltage is determined, and the driving voltage is established. The measurement results and the established driving voltages are listed in Table 4. The measuring method is the same as Example 1, so that the explanation thereof is omitted herein.

TABLE 4

| | Particle color | Magnetite content (parts by weight) | Charge controlling agent (parts by weight) | Electrostatic force Average charge (×10⁻¹⁷ C/particle) | Binding force Volume average primary particle diameter (μm) | Quantity of magnetism (emu/g) | Shape factor | Polarity | Moving voltage (V) | Driving voltage (V) |
|---|---|---|---|---|---|---|---|---|---|---|
| Particle group 34C | Cyan | 0 | 2 | −14 | 1 | 0 | 120 | Negative | 46 | 55 |
| Particle group 34M | Magenta | 0 | 1.5 | −10.5 | 1 | 0 | 120 | Negative | 62 | 73 |
| Particle group 34Y | Yellow | 0 | 1 | −7 | 1 | 0 | 120 | Negative | 93 | 110 |

The average charge, volume average primary particle diameter, quantity of magnetism, and shape factor SF1 are measured in the same manner as Example 1.

An image display medium 12 is prepared in the same manner as Example 1, except that the yellow particle group 34Y, magenta particle group 34M, and cyan particle group 34C prepared in Example 1 are replaced with the yellow particle group 34Y, magenta particle group 34M, and cyan particle group 34C prepared in Example 3.

In addition, an image display device is prepared in the same manner as Example 1, except that the image display medium prepared in Example 1 is replaced with the image display medium 12 prepared in Example 3.

The electrode of the display substrate is connected to Trek 610C (trade name, manufactured by Trek) as the voltage application unit 16, and the electrode of the rear substrate is grounded. To the voltage application unit 16, a personal computer (trade name: CF-R1, manufactured by Matsushita Electric Industrial Co., Ltd.) is connected as a machine having the functions of the control unit 18, the memory unit 14, and the acquisition unit 15. The personal computer contains the processing program shown in FIGS. 6A and 6B, and the storage area in the personal computer stores the correspondence table 14A shown in FIG. 4 containing the particle colors and driving voltage levels listed in Table 4 and the correspondence table 14B shown in FIG. 5.

Using the above-described image display device, the flowchart shown in FIGS. 6A and 6B is executed in the control unit 18 on the cases where the display image information containing display color information of cyan, magenta, yellow, black, blue, red, or green is obtained; the color of the display color information contained in the obtained display image information is displayed on the image display medium 12.

The result indicates that desired colors are also displayed in Example 3 by selectively moving the color particles of the particle groups 34.

As shown by Example 3, when the particle groups have different average charges and nearly equal adhesion forces to the display substrate 20 and the rear substrate 22 such that they initiate moving at different electric field intensities, they move to the opposing substrate upon the formation of an electric field intensity which exceeds the adhesion force and is equal to or higher the electric field intensity to initiate movement of the corresponding color particle group of the particle groups 34. Therefore, the electric field intensity to readily initiate moving can be established for each color particles of the particle groups 34 by adjusting the average charge of the particles.

In Example 3, the adhesion force of the particles to the display substrate 20 and the rear substrate 22 is, according to a microscopic observation of each particle, regarded as composed of van der Waals forces between particles and the substrate and van der Waals forces between particles, and according to a macroscopic observation of the whole particle group, it can be regarded as the adhesion force of the particle group including the particles not in direct contact with the substrate.

In Example 3, the van der Waals forces are adjusted by the shape of the particles. Alternatively, the van der Waals forces can also be adjusted by the material of the particles or the substrates, or the surface shape.

Fourth Example

In the first example, in order to adjust the color particle groups of the particle groups 34 to have the same binding force for the display substrate 20 and the rear substrate 22 and different electrostatic forces, the yellow particle group 34Y, the magenta particle group 34M, and the cyan particle group 34C which have different average charges and nearly equal magnetic forces (magnetism) are enclosed in the image display medium 12. In the present exemplary embodiment, the particles groups are adjusted to have nearly equal average charges and different magnetic forces (quantity of magnetism).

—Preparation of Magenta Particle Group 34M—

The magenta particles of the magenta particle group 34M are prepared by the following procedure.

More specifically, the magenta particles are prepared in the same manner as the magenta particle group 34M of Example 1. The polarity is measured in the same manner as Example 1, and is found to be negative.

As described in Example 1, the particles of the magenta particle group 34M contain 13.3 parts by weight of magenta color-coated magnetite so as to adjust the quantity of magnetism (saturation magnetization σs) of the particles of the magenta particle group 34M at 12 emu/g.

—Preparation of Cyan Particle Group 34C—

The cyan particles of the magenta particle group 34C are prepared by the following procedure. More specifically, the cyan particles are prepared in the same manner as the cyan particle group 34C of Example 1, except that the amount of the cyan color-coated magnetite in the dispersion liquid A is changed to 6.7 parts by weight. The polarity is measured in the same manner as Example 1, and is found to be negative.

In Example 4, the particles of the cyan particle group 34C contain 6.7 parts by weight of cyan color-coated magnetite so as to adjust the quantity of magnetism (saturation magnetization σs) of the particles at 8 emu/g, which is lower than that of the magenta particle group 34M.

—Preparation of Yellow Particle Group 34Y—

The yellow particles of the yellow particle group 34Y are prepared by the following procedure. More specifically, the yellow particles are prepared in the same manner as the yellow particle group 34Y of Example 1, except that the amount of the yellow color-coated magnetite in the dispersion liquid A is changed to 20 parts by weight. The polarity is measured in the same manner as Example 1, and is found to be negative.

In Example 4, as described above, the particles of the yellow particle group 34Y contain 20 parts by weight of yellow color-coated magnetite so as to adjust the quantity of magnetism (saturation magnetization σs) of the particles at 16 emu/g, which is higher than that of the magenta particle group 34M.

Each of the thus obtained color particles of the particle groups 34 is measured for the average charge contributing to the "electrostatic force", the volume average primary particle diameter, quantity of magnetism, and shape factor SF1 contributing to the "binding force" in the same manner as Example 1. In addition, using an image display medium prepared in the same manner as Example 1, the relationship between the applied voltage and the display density is measured, the moving voltage is determined, and the driving voltage is established. The measurement results and the established driving voltages are listed in Table 5. The measuring method is the same as Example 1, so that the explanation thereof is omitted herein.

shown in FIG. 4 containing the particle colors and driving voltage levels listed in Table 5 and the correspondence table 14B shown in FIG. 5.

Using the above-described image display device, the flowchart shown in FIGS. 6A and 6B is executed in the control unit 18 on the cases where the display image information containing display color information of cyan, magenta, yellow, black, blue, red, or green is obtained; the color of the display color information contained in the obtained display image information is displayed on the image display medium 12.

The result indicates that desired colors are displayed also in Example 4 by selectively moving the color particles of the particle groups 34.

As shown by Example 4, as the particle groups which initiate moving at different electric field intensities, when the color particles of the particle groups 34 are adjusted such that they have nearly equal average charges and different magnetic forces (quantity of magnetism), they can be adjusted as particle groups which initiate moving at different electric field intensities.

In addition, the magnetic force effectively acts even on particles not in contact with the substrate, which sufficiently prevents undesired particles from being dragged by moving particles, and suppresses color mixing.

TABLE 5

| | | | | Binding force | | | | | |
|---|---|---|---|---|---|---|---|---|---|
| | Particle color | Magnetite content (parts by weight) | Charge controlling agent (parts by weight) | Electrostatic force Average charge ($\times 10^{-17}$ C/particle) | Volume average primary particle diameter (μm) | Quantity of magnetism (emu/g) | Shape factor | Polarity | Moving voltage (V) | Driving voltage (V) |
| Particle group 34C | Cyan | 6.7 | 1.5 | −10.5 | 1 | 8 | 107 | Negative | 46 | 55 |
| Particle group 34M | Magenta | 13.3 | 1.5 | −10.5 | 1 | 12 | 106 | Negative | 62 | 73 |
| Particle group 34Y | Yellow | 20 | 1.5 | −10.5 | 1 | 16 | 107 | Negative | 93 | 110 |

The average charge, volume average primary particle diameter, quantity of magnetism, shape factor SF1 are measured in the same manner as Example 1.

An image display medium 12 is prepared in the same manner as Example 1, except that the yellow particle group 34Y, magenta particle group 34M, and cyan particle group 34C prepared in Example 1 are replaced with the yellow particle group 34Y, magenta particle group 34M, and cyan particle group 34C prepared in Example 4.

In addition, an image display device is prepared in the same manner as Example 1, except that the image display medium prepared in Example 1 is replaced with the image display medium 12 prepared in Example 4.

The electrode of the display substrate is connected to Trek 610C (trade name, manufactured by Trek) as the voltage application unit 16, and the electrode of the rear substrate is grounded. To the voltage application unit 16, a personal computer (trade name: CF-R1, manufactured by Matsushita Electric Industrial Co., Ltd.) is connected as a machine having the functions of the control unit 18, memory unit 14, and acquisition unit 15. The personal computer contains the processing program shown in FIGS. 6A and 6B, and the storage area in the personal computer stores the correspondence table 14A Example 5

Example 5 describes the case where the color particles of the particle groups 34 are adjusted such that they have nearly equal average charges and different particle diameters so that they initiate moving at different electric field intensities.

—Preparation of Magenta Particle Group 34M—

53 parts by weight of cyclohexyl methacrylate, 3 parts by weight of a magenta pigment (trade name: Carmine 6B, manufactured by Dainichiseika Color & Chemicals Mfg. Co., Ltd.), and 2 parts by weight of a charge controlling agent (trade name: COPY CHARGE PSY VP2038, manufactured by Clariant Japan) are pulverized in a ball mill for 20 hours together with zirconia balls having a diameter of 10 mm to obtain a dispersion liquid A.

Subsequently, 40 parts by weight of calcium carbonate and 60 parts by weight of water are pulverized in a ball mill to obtain a calcium carbonate dispersion liquid B. Thereafter, 4.3 parts by weight of a 2% Cellogen aqueous solution, 20.1 parts by weight of the calcium carbonate dispersion liquid B, and 50 parts by weight of 20% salt solution are mixed, the mixture is deaerated in an ultrasonic device for 10 minutes, and stirred in an emulsifier to obtain a mixed solution C.

35 parts by weight of the thus prepared dispersion liquid A, 1 part by weight of divinylbenzene, and 0.35 parts by weight of a polymerization initiator AIBN are thoroughly mixed, and the mixture is deaerated in an ultrasonic device for 10 minutes. The mixture is added to the mixed solution C, and emulsified with an emulsifier.

Subsequently, the emulsified liquid is placed in a bottle, closed with a silicon cap, thoroughly deaerated under reduced pressure using an injection needle, and then the bottle is filled with a nitrogen gas. Subsequently, the emulsified liquid is reacted at 60° C. for 10 hours to obtain particle powder. The thus obtained particle powder is dispersed in ion-exchanged water, calcium carbonate is decomposed with hydrochloric acid water, and the mixture is filtered. Thereafter, the powder is repeatedly washed with distilled water. Thereafter, the powder is vacuum dried at 30° C. for 6 hours, and pulverized for 30 minutes using an attritor to obtain particles.

2 parts by weight of the thus obtained particles are added to 98 parts by weight of silicone oil (octamethyl trisiloxane), and dispersed and mixed under stirring to obtain a dispersion liquid of the magenta particle group 34M. The thus obtained particles have a volume average primary particle diameter of 1.4 μm. The polarity is measured in the same manner as Example 1, and is found to be negative.

—Preparation of Cyan Particle Group 34C—

A dispersion liquid of the cyan particle group 34C is obtained in the same manner as the magenta particle group 34M prepared in Example 5, except that the amount of the calcium carbonate dispersion B in the mixed solution C is changed to 20.4 parts by weight, and the magenta pigment is replaced with a cyan pigment (trade name: Cyanine Blue 4933M, manufactured by Dainichiseika Color & Chemicals Mfg. Co., Ltd.). The thus obtained cyan particles have a volume average primary particle diameter of 1.4 μm. The polarity is measured in the same manner as Example 1, and is found to be negative.

—Preparation of Yellow Particle Group 34Y—

A mixed solution of the yellow particle group 34Y of a yellow color is obtained in the same manner as the magenta particle group 34M of a magenta color prepared in Example 5, except that the amount of the calcium carbonate dispersion B in the mixed solution C is changed to 19.8 parts by weight, and the magenta pigment is replaced with a yellow pigment (trade name: Pigment Yellow 17, manufactured by Dainichiseika Color & Chemicals Mfg. Co., Ltd.). The thus obtained cyan particles have a volume average primary particle diameter of 1.8 μm. The polarity is measured in the same manner as Example 1, and is found to be negative.

The particle groups in the thus obtained mixed solution are measured for the average charge contributing to the "electrostatic force", volume average primary particle diameter contributing to the "binding force", quantity of magnetism, and shape factor SF1 in the same manner as Example 1. In addition, using an image display medium prepared in the same manner as Example 1, the relationship between the applied voltage and the display density is measured, the moving voltage is determined, and the driving voltage is established. The measurement results and the established driving voltages are listed in Table 6.

TABLE 6

| | Particle color | Magnetite content (parts by weight) | Charge controlling agent (parts by weight) | Electrostatic force Average charge ($\times 10^{-17}$ C/particle) | Binding force Volume average primary particle diameter (μm) | Quantity of magnetism (emu/g) | Shape factor | Polarity | Moving voltage (V) | Driving voltage (V) |
|---|---|---|---|---|---|---|---|---|---|---|
| Particle group 34C | Cyan | 0 | 2 | −10.5 | 1 | 0 | 106 | Negative | 51 | 56 |
| Particle group 34M | Magenta | 0 | 2 | −10.5 | 1.4 | 0 | 107 | Negative | 57 | 62 |
| Particle group 34Y | Yellow | 0 | 2 | −10.5 | 1.8 | 0 | 106 | Negative | 63 | 68 |

The average charge, volume average primary particle diameter, quantity of magnetism, and shape factor SF1 are measured in the same manner as Example 1.

An image display medium 12 is prepared in the same manner as Example 1, except that the yellow particle group 34Y, magenta particle group 34M, and cyan particle group 34C prepared in Example 1 are replaced with the yellow particle group 34Y, magenta particle group 34M, and cyan particle group 34C prepared in Example 5.

In addition, an image display device is prepared in the same manner as Example 1, except that the image display medium prepared in Example 1 is replaced with the image display medium 12 prepared in Example 5.

The electrode of the display substrate is connected to Trek 610C (trade name, manufactured by Trek) as the voltage application unit 16, and the electrode of the rear substrate is grounded. To the voltage application unit 16, a personal computer (trade name: CF-R1, manufactured by Matsushita Electric Industrial Co., Ltd.) is connected as a machine having the functions of the control unit 18, the memory unit 14, and the acquisition unit 15. The personal computer contains the processing program shown in FIGS. 6A and 6B, and the storage area in the personal computer stores the correspondence table 14A shown in FIG. 4 containing the particle colors and driving voltage levels listed in Table 6 and the correspondence table 14B shown in FIG. 5.

Using the above-described image display device, the flowchart shown in FIGS. 6A and 6B is executed in the control unit 18 on the cases where the display image information containing display color information of cyan, magenta, yellow, black, blue, red, or green is obtained; the color of the display color information contained in the obtained display image information is displayed on the image display medium 12.

The result indicates that desired colors are displayed also in Example 5 by selectively moving the color particles of the particle groups 34.

What is claimed is:
1. An image display medium comprising:
a pair of substrates, at least one of which has translucency, the pair of substrates being disposed opposite to each other with a gap therebetween;

a dispersion medium that has translucency and that is enclosed between the pair of substrates, the dispersion medium being an insulating liquid;

at least three kinds of particle groups that:
(i) are movably dispersed in the dispersion medium,
(ii) move according to an electric field,
(iii) each of respective kinds of the particle groups have different colors and different forces for separation from the substrates,
(iv) are all charged with the same polarity, and
(v) require a different range of an electric field to initiate movement of each of the at least three kinds of particles groups; and insulating particles (1) that have a different color than the at least three kinds of particle groups, (2) that are enclosed between the pair of substrates, and (3) that do not move when an electric field of from $5 \times 10^5$ V/m to $10 \times 10^5$ V/m is applied, the insulating particles being disposed with gaps between the insulating particles through which particles of the at least three kinds of particle groups can pass, and the insulating particles being disposed in a direction substantially perpendicular to the normal of the pair of substrates.

2. The image display medium of claim 1, wherein the at least three kinds of particle groups initiate moving from one substrate of the pair of substrates to the other substrate at different electric field intensities.

3. The image display medium of claim 1, wherein a resistance at an interface between the dispersion medium and a particle of the at least three kinds of particle groups is different for each of the kinds of particle groups.

4. The image display medium of claim 1, wherein an average charge of a particle is different between respective particle groups of the at least three kinds of particle groups.

5. The image display medium of claim 1, wherein a magnetic charge of a particle is different between respective particle groups of the at least three kinds of particle groups.

6. The image display medium of claim 1, wherein a volume average primary particle size of a particle is different between respective particle groups of the at least three kinds of particle groups.

7. The image display medium of claim 1, wherein a shape factor SF1 of a particle is different between respective particle groups of the at least three kinds of particle groups.

8. The image display medium of claim 1, wherein the at least three kinds of particle groups comprise a magenta particle group of a magenta color, a yellow particle group of a yellow color, and a cyan particle group of a cyan color.

9. The image display medium of claim 1, wherein color forming properties exhibited by the at least three kinds of particle groups in a dispersed state are different between the kinds of the at least three kinds of particle groups.

10. The image display medium of claim 1, wherein the at least three kinds of particle groups include a plurality of particles, the plurality of particles being metal colloid particles having color strength due to plasmon resonance.

11. The image display medium of claim 1, wherein the insulating liquid includes a surfactant.

12. The image display medium of claim 1, further comprising:
a pair of electrodes respectively corresponding to the pair of substrates so that the dispersion medium is provided between the pair of electrodes, the pair of electrodes being substantially equal in area.

13. An image display device comprising:
an image display medium that comprises:
a pair of substrates, at least one of which has translucency, the pair of substrates being disposed opposite to each other with a gap therebetween;
a dispersion medium that has translucency and that is enclosed between the pair of substrates, the dispersion medium being an insulating liquid;
at least three kinds of particle groups that:
(i) are movably dispersed in the dispersion medium,
(ii) move according to an electric field,
(iii) each of respective kinds of the particle groups have different colors and require different forces for separation from the substrates, and
(iv) are all charged with the same polarity;
insulating particles (1) that have a different color than the at least three kinds of particle groups, (2) that are enclosed between the pair of substrates, and (3) that do not move when an electric field of from $5 \times 10^5$ V/m to $10 \times 10^5$ V/m is applied, the insulating particles being disposed with gaps between the insulating particles through which particles of the at least three kinds of particle groups can pass, and the insulating particles being disposed in a direction substantially perpendicular to the normal of the pair of substrates, and
an electric field generation unit that forms an electric field between the pair of substrates at an intensity according to the particle group to be moved.

14. The image display device of claim 13,
wherein the at least three kinds particle groups comprises:
a first particle group colored in a predetermined first color;
a second particle group colored in a second color different from the first particle group and requiring a smaller force for separation from the substrate than the first particle group: and
a third particle group colored in a third color different from the first and second particle groups and requiring a smaller force for separation from the substrate than the first particle group and the second particle group, and
wherein the electric field generation unit forms a first, a second or a third electric field to display a subtractive color mixture of the first, the second and the third colors,
wherein the first electric field has an intensity that moves the first, the second and the third particle groups to the substrate having translucency to display a subtractive color mixture of the first, the second and the third colors;
wherein the second electric field, which is formed after the first electric field is formed, has an intensity that moves the second and the third particle groups from the substrate having translucency to the other substrate to display the first color; and
wherein the third electric field, which is formed after the second electric field is formed, has an intensity that moves the third particle group from the other substrate to the substrate having translucency to display a subtractive color mixture of the first and the third colors.

15. A writing device comprising:
a voltage application unit that applies a voltage between a pair of substrates of an image display medium, the image display medium comprising:
the pair of substrates, at least one of which has translucency, the pair of substrates being disposed opposite to each other with a gap therebetween;

a dispersion medium that has translucency and that is enclosed between the pair of substrates, the dispersion medium being an insulating liquid;

at least three kinds of particle groups that:
(i) are movably dispersed in the dispersion medium,
(ii) move according to an electric field,
(iii) each of respective kinds of the particle groups have different colors and require different forces for separation from the substrates, and
(iv) are all charged with the same polarity;

insulating particles (1) that have a different color than the at least three kinds of particle groups, (2) that are enclosed between the pair of substrates, and (3) that do not move when an electric field of from $5 \times 10^5$ V/m to $10 \times 10^5$ V/m is applied, the insulating particles being disposed with gaps between the insulating particles through which particles of the at least three kinds of particle groups can pass, and the insulating particles being disposed in a direction substantially perpendicular to the normal of the pair of substrates;

an acquisition unit that obtains display image information containing display color information indicating an image color to be displayed on the display image medium;

a memory unit that memorizes (1) sequence information for the display color information indicating an image color to be displayed on the image display medium, (2) particle color information, (3) polarity information, and (4) driving voltage information corresponding to each item of the particle color information, respective items of information being correlated with each other; and a control unit that controls the voltage application unit so as to read the driving voltage information corresponding to the display color information contained in the display image information obtained by the acquisition unit, and that applies the driving voltage according to the obtained driving voltage information.

16. A method of display comprising:

providing an image display device comprising an image display medium, the image display medium comprising:
a pair of substrates, at least one of which has translucency, the pair of substrates being disposed opposite to each other with a gap therebetween;
a dispersion medium that has translucency and that is enclosed between the pair of substrates, the dispersion medium being an insulating liquid;
at least three kinds of particle groups that:
(i) are movably dispersed in the dispersion medium,
(ii) move according to an electric field,
(iii) each of respective kinds of the particle groups have different colors and require different forces for separation from the substrates, and
(iv) are all charged with the same polarity, the plurality of kinds of particle groups comprising:
(1) a first particle group colored in a predetermined first color;
(2) a second particle group colored in a second color different from the first particle group and requiring a smaller force for separation from the substrates than the first particle group; and
(3) a third particle group colored in a third color different from the first and second particle groups and requiring a smaller force for separation from the substrates than the first particle group and the second particle group, wherein each of (i) a range of an electric field required to initiate movement of the first particle group, (ii) a range of an electric field required to initiate movement of the second particle group, and (iii) a range of an electric field required to initiate movement of the third particle group being different;

an electric field generation unit that forms an electric field between the pair of substrates of the image display medium; and insulating particles (1) that have a different color than the at least three kinds of particle groups, (2) that are enclosed between the pair of substrates, and (3) that do not move when an electric field of from $5 \times 10^5$ V/m to $10 \times 10^5$ V/m is applied, the insulating particles being disposed with gaps between the insulating particles through which particles of the at least three kinds of particle groups can pass, and the insulating particles being disposed in a direction substantially perpendicular to the normal of the pair of substrates;

forming an electric field between the substrates at an intensity that moves the first, second, and third particle groups to one substrate of the pair of substrates, thereby displaying a fourth color which is a subtractive color mixture of the first, second, and third colors;

forming, while the fourth color is displayed, an electric field between the substrates at an intensity that moves the second and third particle groups from the one substrate to the other substrate, thereby displaying the first color;

forming, while the first color is displayed, an electric field between the substrates at an intensity that moves the third particle group from the other substrate to the one substrate, thereby displaying a fifth color which is a subtractive color mixture of the first and third colors;

forming, while the fourth color is displayed, an electric field between the substrates at an intensity that moves the third particle group from the one substrate to the other substrate, thereby displaying a sixth color which is a subtractive color mixture of the first and second colors;

forming an electric field between the substrates at an intensity that moves the first, second, and third particle groups to the other substrate, and thereafter forming an electric field between the substrates at an intensity that moves the second and third particle groups from the other substrate to the one substrate, thereby displaying a seventh color which is a subtractive color mixture of the second and third colors;

forming, while the seventh color is displayed, an electric field between the substrates at an intensity that moves the third particle group from the one substrate to the other substrate, thereby displaying the second color; and forming an electric field between the substrates at an intensity that moves the first, second, and third particle groups to the other substrate, and thereafter forming an electric field between the substrates at an intensity that moves the third particle group from the other substrate to the one substrate, thereby displaying the third color, wherein at least one of these processes is selected in order to perform display.

17. The method of display of claim 16, wherein the first color is a yellow color, the second color is a magenta color, and the third color is a cyan color.

18. An image display medium comprising:
a pair of substrates, at least one of which has translucency, the pair of substrates being disposed opposite to each other with a gap therebetween;
a dispersion medium that has translucency and that is enclosed between the pair of substrates, the dispersion medium being an insulating liquid;

at least three kinds of particle groups that:
- (i) are movably dispersed in the dispersion medium,
- (ii) move according to an electric field,
- (iii) each of respective kinds of the particle groups have different colors and require different forces for separation from the substrates, and
- (iv) are all charged with the same polarity; and insulating particles (1) that have a different color than the at least three kinds of particle groups, (2) that are enclosed between the pair of substrates, and (3) that do not move when an electric field of from $5 \times 10^5$ V/m to $10 \times 10^5$ V/m is applied, the insulating particles being disposed with gaps between the insulating particles through which particles of the at least three kinds of particle groups can pass, and the insulating particles being disposed in a direction substantially perpendicular to the normal of the pair of substrates, at least one selected from the group consisting of (1) a magnetic charge, (2) a volume average primary particle size and (3) a shape factor SF1 of a particle of at least one particle group being different than other particle groups of the at least three kinds of particle groups.

\* \* \* \* \*